US010839504B2

(12) United States Patent
Taheri et al.

(10) Patent No.: US 10,839,504 B2
(45) Date of Patent: *Nov. 17, 2020

(54) USER INTERFACE FOR MANAGING DEFECTS

(71) Applicant: Palantir Technologies Inc., Palo Alto, CA (US)

(72) Inventors: Alexander Taheri, Madison, CT (US); Alexandru-viorel Antihi, Palo Alto, CA (US); Arion Sprague, San Francisco, CA (US); Benjamin Grabham, London (GB); Benjamin Lee, London (GB); Gregoire Omont, London (GB); Jim Inoue, Kirkland, WA (US); Michael Yang, New York, NY (US); Myles Scolnick, New York, NY (US); Pierre Lucotte, Paris (FR); Ryan Rowe, Portola Valley, CA (US); Tarik Benabdallah, Paris (FR); Thomas Powell, London (GB)

(73) Assignee: Palantir Technologies Inc., Palo Alto, CA (US)

(*) Notice: Subject to any disclaimer, the term of this patent is extended or adjusted under 35 U.S.C. 154(b) by 2 days.

This patent is subject to a terminal disclaimer.

(21) Appl. No.: 16/297,308

(22) Filed: Mar. 8, 2019

(65) Prior Publication Data

US 2019/0206049 A1   Jul. 4, 2019

Related U.S. Application Data

(63) Continuation of application No. 15/448,155, filed on Mar. 2, 2017, now Pat. No. 10,249,033.

(Continued)

(51) Int. Cl.
  *G06F 3/0482* (2013.01)
  *G06T 7/00* (2017.01)

(52) U.S. Cl.
  CPC .......... *G06T 7/0006* (2013.01); *G06F 3/0482* (2013.01)

(58) Field of Classification Search
  CPC ........................... G06T 7/0006; G06F 3/0482
  See application file for complete search history.

(56) References Cited

U.S. PATENT DOCUMENTS

| 5,515,488 A | 5/1996 | Hoppe et al. |
| 5,801,965 A | 1/1998 | Takagi et al. |

(Continued)

FOREIGN PATENT DOCUMENTS

| CN | 102546446 | 7/2012 |
| CN | 103167093 | 6/2013 |

(Continued)

OTHER PUBLICATIONS

Official Communication for U.S. Appl. No. 15/448,155 dated May 19, 2017.

(Continued)

*Primary Examiner* — Anil K Bhargava
(74) *Attorney, Agent, or Firm* — Sheppard Mullin Richter & Hampton LLP

(57) ABSTRACT

User interfaces for managing defects are provided. A defect selection interface may include a set of defect items for selection by a user. The defect selection interface may include one or more first visuals indicating similarity of the set of defect items to other defect items. An issue selection interface may include a set of issue items for selection by the user. Individual issue items may include one or more defect items added to the individual issue items. A defect comparison interface may include a comparison of a defect item to an issue item. The defect comparison interface may include one or more second visuals indicating similarity of the (Continued)

defect item to the issue item. Based on the user's selection, the defect item may be added to the issue item.

18 Claims, 8 Drawing Sheets

Related U.S. Application Data

(60) Provisional application No. 62/436,967, filed on Dec. 20, 2016.

(56) References Cited

U.S. PATENT DOCUMENTS

| | | | |
|---|---|---|---|
| 5,905,650 A | 5/1999 | Tsutsui et al. | |
| 5,991,699 A | 11/1999 | Kulkarni | |
| 6,246,787 B1 | 6/2001 | Hennessey et al. | |
| 6,336,082 B1 | 1/2002 | Nguyen et al. | |
| 6,430,305 B1 | 8/2002 | Decker | |
| 6,611,728 B1 | 8/2003 | Morioka | |
| 6,779,159 B2 | 8/2004 | Yokoyama et al. | |
| 6,820,135 B1 | 11/2004 | Dingman | |
| 6,978,419 B1 | 12/2005 | Kantrowitz | |
| 6,980,984 B1 | 12/2005 | Huffman et al. | |
| 7,168,039 B2 | 1/2007 | Bertram | |
| 7,461,077 B1 | 12/2008 | Greenwood | |
| 7,617,232 B2 | 11/2009 | Gabbert et al. | |
| 7,756,843 B1 | 7/2010 | Palmer | |
| 7,899,796 B1 | 3/2011 | Borthwick et al. | |
| 7,917,376 B2 | 3/2011 | Bellin et al. | |
| 7,941,321 B2 | 5/2011 | Greenstein et al. | |
| 8,036,971 B2 | 10/2011 | Aymeloglu et al. | |
| 8,037,046 B2 | 10/2011 | Udezue et al. | |
| 8,046,283 B2 | 10/2011 | Burns | |
| 8,054,756 B2 | 11/2011 | Chand et al. | |
| 8,214,490 B1 | 7/2012 | Vos et al. | |
| 8,229,902 B2 | 7/2012 | Vishniac et al. | |
| 8,290,838 B1 | 10/2012 | Thakur et al. | |
| 8,302,855 B2 | 11/2012 | Ma et al. | |
| 8,386,377 B1 | 2/2013 | Xiong et al. | |
| 8,473,454 B2 | 6/2013 | Evanitsky et al. | |
| 8,484,115 B2 | 7/2013 | Aymeloglu et al. | |
| 8,489,641 B1 | 7/2013 | Seefeld et al. | |
| 8,577,911 B1 | 11/2013 | Stepinski et al. | |
| 8,589,273 B2 | 11/2013 | Creeden et al. | |
| 8,688,573 B1 | 4/2014 | Ruknoic et al. | |
| 8,744,890 B1 | 6/2014 | Bernier | |
| 8,799,799 B1 | 8/2014 | Cervelli et al. | |
| 8,806,355 B2 | 8/2014 | Twiss et al. | |
| 8,812,960 B1 | 8/2014 | Sun et al. | |
| 8,924,388 B2 | 12/2014 | Elliot et al. | |
| 8,924,389 B2 | 12/2014 | Elliot et al. | |
| 8,938,686 B1 | 1/2015 | Erenrich et al. | |
| 8,949,164 B1 | 2/2015 | Mohler | |
| 9,020,943 B2 | 4/2015 | Caldwell et al. | |
| 9,069,842 B2 | 6/2015 | Melby | |
| 9,100,428 B1 | 8/2015 | Visbal | |
| 9,111,281 B2 | 8/2015 | Stibel et al. | |
| 9,129,219 B1 | 9/2015 | Robertson et al. | |
| 9,256,664 B2 | 2/2016 | Chakerian et al. | |
| 9,280,618 B1 | 3/2016 | Bruce et al. | |
| 9,286,373 B2 | 3/2016 | Elliot et al. | |
| 9,335,911 B1 | 5/2016 | Elliot et al. | |
| 10,249,033 B1 | 4/2019 | Taheri et al. | |
| 2001/0020194 A1 | 9/2001 | Takagi et al. | |
| 2002/0065708 A1 | 5/2002 | Senay et al. | |
| 2002/0095360 A1 | 7/2002 | Joao | |
| 2002/0095658 A1 | 7/2002 | Shulman | |
| 2002/0103705 A1 | 8/2002 | Brady | |
| 2002/0147805 A1 | 10/2002 | Leshem et al. | |
| 2002/0161532 A1 | 10/2002 | Dor et al. | |
| 2002/0181756 A1 | 12/2002 | Shibuya et al. | |
| 2003/0126102 A1 | 7/2003 | Borthwick | |
| 2003/0138978 A1 | 7/2003 | Tanaka | |
| 2004/0034570 A1 | 2/2004 | Davis | |
| 2004/0044484 A1 | 3/2004 | Obara et al. | |
| 2004/0064269 A1 | 4/2004 | Shibuya et al. | |
| 2004/0111480 A1 | 6/2004 | Yue | |
| 2004/0153418 A1 | 8/2004 | Hanweck | |
| 2004/0158409 A1 | 8/2004 | Teshima et al. | |
| 2004/0218806 A1 | 11/2004 | Miyamoto et al. | |
| 2004/0236688 A1 | 11/2004 | Bozeman | |
| 2005/0010472 A1 | 1/2005 | Quatse et al. | |
| 2005/0050210 A1* | 3/2005 | Kennedy | H04L 67/36 709/229 |
| 2005/0086207 A1 | 4/2005 | Heuer et al. | |
| 2005/0097482 A1 | 5/2005 | Hanson et al. | |
| 2005/0154628 A1 | 7/2005 | Eckart et al. | |
| 2005/0154769 A1 | 7/2005 | Eckart et al. | |
| 2005/0271261 A1 | 12/2005 | Onishi et al. | |
| 2006/0026120 A1 | 2/2006 | Carolan et al. | |
| 2006/0026170 A1 | 2/2006 | Kreitler et al. | |
| 2006/0080283 A1 | 4/2006 | Shipman | |
| 2006/0082763 A1* | 4/2006 | Teh | G06T 7/0004 356/72 |
| 2006/0143034 A1 | 6/2006 | Rothermel | |
| 2006/0143075 A1 | 6/2006 | Carr et al. | |
| 2006/0143079 A1 | 6/2006 | Basak et al. | |
| 2006/0271526 A1* | 11/2006 | Charnock | G06Q 30/02 |
| 2007/0000999 A1 | 1/2007 | Kubo et al. | |
| 2007/0011304 A1 | 1/2007 | Error | |
| 2007/0031982 A1 | 2/2007 | Lim et al. | |
| 2007/0038646 A1 | 2/2007 | Thota | |
| 2007/0047801 A1 | 3/2007 | Kojima et al. | |
| 2007/0150801 A1 | 6/2007 | Chidlovskii et al. | |
| 2007/0156673 A1 | 7/2007 | Maga | |
| 2007/0162454 A1 | 7/2007 | D'Albora et al. | |
| 2007/0185867 A1 | 8/2007 | Maga | |
| 2007/0192122 A1 | 8/2007 | Routson et al. | |
| 2007/0284433 A1 | 12/2007 | Domenica et al. | |
| 2007/0288219 A1* | 12/2007 | Zafar | G06T 7/0008 703/14 |
| 2008/0015802 A1 | 1/2008 | Urano et al. | |
| 2008/0065655 A1 | 3/2008 | Chakravarthy et al. | |
| 2008/0069081 A1 | 3/2008 | Chand et al. | |
| 2008/0077642 A1 | 3/2008 | Carbone et al. | |
| 2008/0103996 A1 | 5/2008 | Forman et al. | |
| 2008/0175466 A1 | 7/2008 | Ishikawa | |
| 2008/0208735 A1 | 8/2008 | Balet et al. | |
| 2008/0222295 A1 | 9/2008 | Robinson et al. | |
| 2008/0243711 A1 | 10/2008 | Aymeloglu et al. | |
| 2008/0255973 A1 | 10/2008 | El Wade et al. | |
| 2008/0270328 A1 | 10/2008 | Lafferty et al. | |
| 2008/0294663 A1 | 11/2008 | Heinley et al. | |
| 2008/0313132 A1 | 12/2008 | Hao et al. | |
| 2009/0076845 A1 | 3/2009 | Bellin et al. | |
| 2009/0094166 A1 | 4/2009 | Aymeloglu et al. | |
| 2009/0094270 A1 | 4/2009 | Alirez et al. | |
| 2009/0106178 A1 | 4/2009 | Chu | |
| 2009/0112745 A1 | 4/2009 | Stefanescu | |
| 2009/0125359 A1 | 5/2009 | Knapic | |
| 2009/0125459 A1 | 5/2009 | Norton et al. | |
| 2009/0132953 A1 | 5/2009 | Reed et al. | |
| 2009/0153673 A1 | 6/2009 | Chu et al. | |
| 2009/0157732 A1 | 6/2009 | Hao et al. | |
| 2009/0187546 A1 | 7/2009 | Whyte et al. | |
| 2009/0187548 A1 | 7/2009 | Ji et al. | |
| 2009/0249244 A1 | 10/2009 | Robinson et al. | |
| 2009/0254842 A1 | 10/2009 | Leacock et al. | |
| 2009/0259636 A1 | 10/2009 | Labrou et al. | |
| 2009/0271343 A1 | 10/2009 | Vaiciulis et al. | |
| 2009/0307049 A1 | 12/2009 | Elliott et al. | |
| 2009/0313463 A1 | 12/2009 | Pang et al. | |
| 2009/0319418 A1 | 12/2009 | Herz | |
| 2009/0319515 A1 | 12/2009 | Minton et al. | |
| 2009/0319891 A1 | 12/2009 | MacKinlay | |
| 2010/0030722 A1 | 2/2010 | Goodson et al. | |
| 2010/0031141 A1 | 2/2010 | Summers et al. | |
| 2010/0042922 A1 | 2/2010 | Bradateanu et al. | |
| 2010/0057622 A1 | 3/2010 | Faith et al. | |
| 2010/0070842 A1 | 3/2010 | Aymeloglu et al. | |
| 2010/0098318 A1 | 4/2010 | Anderson | |
| 2010/0106752 A1 | 4/2010 | Eckardt et al. | |
| 2010/0114887 A1 | 5/2010 | Conway et al. | |

(56) References Cited

U.S. PATENT DOCUMENTS

| | | | |
|---|---|---|---|
| 2010/0131450 A1* | 5/2010 | Nguyen | G06N 5/022 706/54 |
| 2010/0131502 A1 | 5/2010 | Fordham | |
| 2010/0161735 A1 | 6/2010 | Sharma | |
| 2010/0174691 A1* | 7/2010 | Caldwell | G06F 16/285 707/696 |
| 2010/0191563 A1 | 7/2010 | Schlaifer et al. | |
| 2010/0211535 A1 | 8/2010 | Rosenberger | |
| 2010/0235915 A1 | 9/2010 | Memon et al. | |
| 2010/0262688 A1 | 10/2010 | Hussain et al. | |
| 2010/0293174 A1 | 11/2010 | Bennett et al. | |
| 2010/0312837 A1 | 12/2010 | Bodapati et al. | |
| 2011/0040776 A1 | 2/2011 | Najm et al. | |
| 2011/0061013 A1 | 3/2011 | Bilicki et al. | |
| 2011/0078173 A1 | 3/2011 | Seligmann et al. | |
| 2011/0093327 A1 | 4/2011 | Fordyce, III et al. | |
| 2011/0099133 A1 | 4/2011 | Chang et al. | |
| 2011/0153384 A1 | 6/2011 | Horne et al. | |
| 2011/0173093 A1 | 7/2011 | Psota et al. | |
| 2011/0208565 A1 | 8/2011 | Ross et al. | |
| 2011/0208724 A1 | 8/2011 | Jones et al. | |
| 2011/0213655 A1 | 9/2011 | Henkin | |
| 2011/0218955 A1 | 9/2011 | Tang | |
| 2011/0270604 A1 | 11/2011 | Qi et al. | |
| 2011/0270834 A1 | 11/2011 | Sokolan et al. | |
| 2011/0289397 A1 | 11/2011 | Eastmond et al. | |
| 2011/0295649 A1 | 12/2011 | Fine | |
| 2011/0314007 A1 | 12/2011 | Dassa et al. | |
| 2011/0314024 A1 | 12/2011 | Chang et al. | |
| 2012/0004904 A1 | 1/2012 | Shin et al. | |
| 2012/0011238 A1 | 1/2012 | Rathod | |
| 2012/0011245 A1 | 1/2012 | Gillette et al. | |
| 2012/0022945 A1 | 1/2012 | Falkenborg et al. | |
| 2012/0054284 A1 | 3/2012 | Rakshit | |
| 2012/0059853 A1 | 3/2012 | Jagota | |
| 2012/0066166 A1 | 3/2012 | Curbera et al. | |
| 2012/0079363 A1 | 3/2012 | Folting et al. | |
| 2012/0084117 A1 | 4/2012 | Tavares et al. | |
| 2012/0084287 A1 | 4/2012 | Lakshminarayan et al. | |
| 2012/0089606 A1 | 4/2012 | Eshwar et al. | |
| 2012/0131512 A1 | 5/2012 | Takeuchi et al. | |
| 2012/0144335 A1 | 6/2012 | Abeln et al. | |
| 2012/0155740 A1 | 6/2012 | Cho et al. | |
| 2012/0158527 A1 | 6/2012 | Cannelongo et al. | |
| 2012/0159362 A1 | 6/2012 | Brown et al. | |
| 2012/0173381 A1 | 7/2012 | Smith | |
| 2012/0215784 A1 | 8/2012 | King et al. | |
| 2012/0221553 A1 | 8/2012 | Wittmer et al. | |
| 2012/0226523 A1 | 9/2012 | Weiss | |
| 2012/0245976 A1 | 9/2012 | Kumar et al. | |
| 2012/0246623 A1* | 9/2012 | Creel | G06F 11/3672 717/128 |
| 2012/0323888 A1 | 12/2012 | Osann, Jr. | |
| 2013/0016106 A1 | 1/2013 | Yip et al. | |
| 2013/0054306 A1 | 2/2013 | Bhalla | |
| 2013/0055145 A1 | 2/2013 | Antony et al. | |
| 2013/0057551 A1 | 3/2013 | Ebert et al. | |
| 2013/0096988 A1 | 4/2013 | Grossman et al. | |
| 2013/0110746 A1 | 5/2013 | Ahn | |
| 2013/0151453 A1 | 6/2013 | Bhanot et al. | |
| 2013/0166348 A1 | 6/2013 | Scotto | |
| 2013/0166480 A1 | 6/2013 | Popescu et al. | |
| 2013/0185245 A1 | 7/2013 | Anderson | |
| 2013/0185307 A1 | 7/2013 | El-Yaniv et al. | |
| 2013/0218879 A1 | 8/2013 | Park et al. | |
| 2013/0226318 A1 | 8/2013 | Procyk | |
| 2013/0238616 A1 | 9/2013 | Rose et al. | |
| 2013/0246170 A1 | 9/2013 | Gross et al. | |
| 2013/0246537 A1 | 9/2013 | Gaddala | |
| 2013/0246597 A1 | 9/2013 | Iizawa et al. | |
| 2013/0263019 A1 | 10/2013 | Castellanos et al. | |
| 2013/0268520 A1 | 10/2013 | Fisher et al. | |
| 2013/0282696 A1 | 10/2013 | John et al. | |
| 2013/0290825 A1 | 10/2013 | Arndt et al. | |
| 2013/0297619 A1 | 11/2013 | Chandrasekaran et al. | |
| 2013/0304770 A1 | 11/2013 | Boero et al. | |
| 2013/0318604 A1 | 11/2013 | Coates et al. | |
| 2014/0012796 A1 | 1/2014 | Petersen et al. | |
| 2014/0037188 A1 | 2/2014 | Nakagaki et al. | |
| 2014/0040371 A1 | 2/2014 | Gurevich et al. | |
| 2014/0053091 A1 | 2/2014 | Hou et al. | |
| 2014/0056507 A1 | 2/2014 | Doyle et al. | |
| 2014/0058914 A1 | 2/2014 | Song et al. | |
| 2014/0068487 A1 | 3/2014 | Steiger et al. | |
| 2014/0095509 A1 | 4/2014 | Patton | |
| 2014/0097934 A1 | 4/2014 | Su et al. | |
| 2014/0108380 A1 | 4/2014 | Gotz et al. | |
| 2014/0108985 A1 | 4/2014 | Scott et al. | |
| 2014/0123279 A1 | 5/2014 | Bishop et al. | |
| 2014/0136285 A1 | 5/2014 | Carvalho | |
| 2014/0143009 A1 | 5/2014 | Brice et al. | |
| 2014/0156527 A1 | 6/2014 | Grigg et al. | |
| 2014/0157172 A1 | 6/2014 | Peery et al. | |
| 2014/0164502 A1 | 6/2014 | Khodorenko et al. | |
| 2014/0189536 A1 | 7/2014 | Lange et al. | |
| 2014/0189870 A1 | 7/2014 | Singla et al. | |
| 2014/0195515 A1 | 7/2014 | Baker et al. | |
| 2014/0222521 A1 | 8/2014 | Chait | |
| 2014/0222793 A1 | 8/2014 | Sadkin et al. | |
| 2014/0229554 A1 | 8/2014 | Grunin et al. | |
| 2014/0244644 A1 | 8/2014 | Mashinchi et al. | |
| 2014/0280056 A1 | 9/2014 | Kelly | |
| 2014/0282160 A1 | 9/2014 | Zarpas | |
| 2014/0344230 A1 | 11/2014 | Krause et al. | |
| 2014/0358829 A1 | 12/2014 | Hurwitz | |
| 2014/0366132 A1 | 12/2014 | Stiansen et al. | |
| 2015/0073929 A1 | 3/2015 | Psota et al. | |
| 2015/0073954 A1 | 3/2015 | Braff | |
| 2015/0095773 A1 | 4/2015 | Gonsalves et al. | |
| 2015/0100897 A1 | 4/2015 | Sun et al. | |
| 2015/0106170 A1 | 4/2015 | Bonica | |
| 2015/0106379 A1 | 4/2015 | Elliot et al. | |
| 2015/0134599 A1 | 5/2015 | Banerjee et al. | |
| 2015/0135256 A1 | 5/2015 | Hoy et al. | |
| 2015/0188872 A1 | 7/2015 | White | |
| 2015/0242401 A1 | 8/2015 | Liu | |
| 2015/0248318 A1 | 9/2015 | Farinacci et al. | |
| 2015/0294052 A1 | 10/2015 | Urmanov et al. | |
| 2015/0338233 A1 | 11/2015 | Cervelli et al. | |
| 2015/0379413 A1 | 12/2015 | Robertson et al. | |
| 2016/0004764 A1 | 1/2016 | Chakerian et al. | |
| 2016/0092791 A1 | 3/2016 | Moghaddam et al. | |
| 2016/0180557 A1 | 6/2016 | Yousaf et al. | |
| 2016/0283862 A1 | 9/2016 | Urmanov et al. | |
| 2017/0060995 A1 | 3/2017 | Boule et al. | |
| 2017/0132724 A1* | 5/2017 | Aqlan | G06Q 10/063112 |
| 2017/0192880 A1 | 7/2017 | Ramakrishnan et al. | |
| 2017/0277583 A1 | 9/2017 | Mohandoss | |
| 2018/0129549 A1 | 5/2018 | Fredericks et al. | |
| 2018/0173212 A1 | 6/2018 | Poh et al. | |

FOREIGN PATENT DOCUMENTS

| | | |
|---|---|---|
| CN | 102054015 | 5/2014 |
| DE | 102014204827 | 9/2014 |
| DE | 102014204830 | 9/2014 |
| DE | 102014204834 | 9/2014 |
| EP | 2487610 | 8/2012 |
| EP | 2858018 | 4/2015 |
| EP | 2869211 | 5/2015 |
| EP | 2889814 | 7/2015 |
| EP | 2892197 | 7/2015 |
| EP | 2963595 | 1/2016 |
| EP | 2996053 | 3/2016 |
| EP | 3035214 | 6/2016 |
| EP | 3038002 | 6/2016 |
| EP | 3040885 | 7/2016 |
| WO | WO 2005/116851 | 12/2005 |

(56) References Cited

FOREIGN PATENT DOCUMENTS

| | | |
|---|---|---|
| WO | WO 2009/0110795 | 9/2009 |
| WO | WO 2012/061162 | 5/2012 |

OTHER PUBLICATIONS

Official Communication for U.S. Appl. No. 15/385,664 dated Feb. 8, 2018.
Official Communication for U.S. Appl. No. 15/448,155 dated Jun. 11, 2018.
Official Communication for U.S. Appl. No. 15/448,155 dated Sep. 14, 2017.
Official Communication for U.S. Appl. No. 15/385,664 dated Jun. 28, 2019.
Official Communication for U.S. Appl. No. 15/385,664 dated Jul. 12, 2017.
Official Communication for U.S. Appl. No. 17207019.5 dated Apr. 4, 2019.
"HunchLab: Heat Map and Kernel Density Calculation for Crime Analysis," Azavea Journal, printed from www.azavea.com/blogs/newsletter/v4i4/kernel-density-capabilities-added-to-hunchlab/ on Sep. 9, 2014, 2 pages.
"Refresh CSS Ellipsis When Resizing Container—Stack Overflow," Jul. 31, 2013, retrieved from internet http://stackoverflow.com/questions/17964681/refresh-css-ellipsis-when-resizing-container, retrieved on May 18, 2015.
"SAP BusinessObjects Explorer Online Help," Mar. 19, 2012, retrieved on Apr. 21, 2016 http://help.sap.com/businessobject/product_guides/boexir4/en/xi4_exp_user_en.pdf.
AMNET, "5 Great Tools for Visualizing Your Twitter Followers," posted Aug. 4, 2010, http://www.amnetblog.com/component/content/article/115-5-grate-tools-for-visualizing-your-twitter-followers.html.
APPACTS, "Smart Thinking for Super Apps," <http://www.appacts.com> Printed Jul. 18, 2013 in 4 pages.
APSALAR, "Data Powered Mobile Advertising," "Free Mobile App Analytics" and various analytics related screen shots <http://apsalar.com> Printed Jul. 18, 2013 in 8 pages.
Capptain—Pilot Your Apps, <http://www.capptain.com> Printed Jul. 18, 2013 in 6 pages.
Celik, Tantek, "CSS Basic User Interface Module Level 3 (CSS3 UI)," Section 8 Resizing and Overflow, Jan. 17, 2012, retrieved from internet http://www.w3.org/TR/2012/WD-css3-ui-20120117/#resizing-amp-overflow retrieved on May 18, 2015.
Chaudhuri et al., "An Overview of Business Intelligence Technology," Communications of the ACM, Aug. 2011, vol. 54, No. 8.
Cohn, et al., "Semi-supervised clustering with user feedback," Constrained Clustering: Advances in Algorithms, Theory, and Applications 4.1 (2003): 17-32.
Countly Mobile Analytics, <http://count.ly/> Printed Jul. 18, 2013 in 9 pages.
DISTIMO—App Analytics, <http://www.distimo.com/app-analytics> Printed Jul. 18, 2013 in 5 pages.
Flurry Analytics, <http://www.flurry.com/> Printed Jul. 18, 2013 in 14 pages.
Gill et al., "Computerised Linking of Medical Records: Methodological Guidelines,".
Google Analytics Official Website—Web Analytics & Reporting, <http://www.google.com/analytics.index.html> Printed Jul. 18, 2013 in 22 pages.
Gorr et al., "Crime Hot Spot Forecasting: Modeling and Comparative Evaluation", Grant 98-IJ-CX-K005, May 6, 2002, 37 pages.
Gu et al., "Record Linkage: Current Practice and Future Directions," Jan. 15, 2004, pp. 32.
Hansen et al., "Analyzing Social Media Networks with NodeXL: Insights from a Connected World", Chapter 4, pp. 53-67 and Chapter 10, pp. 143-164, published Sep. 2010.
Hua et al., "A Multi-attribute Data Structure with Parallel Bloom Filters for Network Services", HiPC 2006, LNCS 4297, pp. 277-288, 2006.
Janssen, Jan-Keno, "Wo bist'n du?—Googles Geodienst Latitude," Jan. 17, 2011, pp. 86-88, retrieved from the internet on Jul. 30, 2015 http://www.heise.de/artikel-archiv/ct/2011/03/086/@00250@/ct.11.03.086-088.pdf.
Keylines.com, "An Introduction to KeyLines and Network Visualization," Mar. 2014, <http://keylines.com/wp-content/uploads/2014/03/KeyLines-White-Paper.pdf> downloaded May 12, 2014 in 8 pages.
Keylines.com, "KeyLines Datasheet," Mar. 2014, <http://keylines.com/wp-content/uploads/2014/03/KeyLines-datasheet.pdf> downloaded May 12, 2014 in 2 pages.
Keylines.com, "Visualizing Threats: Improved Cyber Security Through Network Visualization," Apr. 2014, <http://keylines.com/wp-content/uploads/2014/04/Visualizing-Threats1.pdf> downloaded May 12, 2014 in 10 pages.
Kontagent Mobile Analytics, <http://www.kontagent.com/> Printed Jul. 18, 2013 in 9 pages.
Localytics—Mobile App Marketing & Analytics, <http://www.localytics.com/> Printed Jul. 18, 2013 in 12 pages.
Manno et al., "Introducing Collaboration in Single-user Applications through the Centralized Control Architecture," 2010, pp. 10.
Mixpanel—Mobile Analytics, <https://mixpanel.com/> Printed Jul. 18, 2013 in 13 pages.
Notice of Allowance for U.S. Appl. No. 14/225,084 dated May 4, 2015.
Notice of Allowance for U.S. Appl. No. 14/319,161 dated May 4, 2015.
Notice of Allowance for U.S. Appl. No. 14/323,935 dated Oct. 1, 2015.
Notice of Allowance for U.S. Appl. No. 14/479,863 dated Mar. 31, 2015.
Notice of Allowance for U.S. Appl. No. 14/483,527 dated Apr. 29, 2016.
Notice of Allowance for U.S. Appl. No. 14/552,336 dated Nov. 3, 2015.
Notice of Allowance for U.S. Appl. No. 14/746,671 dated Jan. 21, 2016.
Notice of Allowance for U.S. Appl. No. 14/858,647 dated Mar. 4, 2016.
Official Communication for European Patent Application No. 14187996.5 dated Feb. 12, 2015.
Official Communication for European Patent Application No. 14187996.5 dated Feb. 19, 2016.
Official Communication for European Patent Application No. 14191540.5 dated May 27, 2015.
Official Communication for European Patent Application No. 14200246.8 dated May 29, 2015.
Official Communication for European Patent Application No. 14200298.9 dated May 13, 2015.
Official Communication for European Patent Application No. 14202919.5 dated May 9, 2016.
Official Communication for European Patent Application No. 15181419.1 dated Sep. 29, 2015.
Official Communication for European Patent Application No. 15184764.7 dated Dec. 14, 2015.
Official Communication for European Patent Application No. 15200073.3 dated Mar. 30, 2016.
Official Communication for European Patent Application No. 15201924.6 dated Apr. 25, 2016.
Official Communication for European Patent Application No. 16152984.7 dated Mar. 24, 2016.
Official Communication for Great Britain Patent Application No. 1404486.1 dated May 21, 2015.
Official Communication for Great Britain Patent Application No. 1404486.1 dated Aug. 27, 2014.
Official Communication for Great Britain Patent Application No. 1404489.5 dated May 21, 2015.
Official Communication for Great Britain Patent Application No. 1404489.5 dated Aug. 27, 2014.

(56) References Cited

OTHER PUBLICATIONS

Official Communication for Great Britain Patent Application No. 1404489.5 dated Oct. 6, 2014.
Official Communication for Great Britain Patent Application No. 1404499.4 dated Jun. 11, 2015.
Official Communication for Great Britain Patent Application No. 1404499.4 dated Aug. 20, 2014.
Official Communication for Great Britain Patent Application No. 1404499.4 dated Sep. 29, 2014.
Official Communication for Netherlands Patent Application No. 2012417 dated Sep. 18, 2015.
Official Communication for Netherlands Patent Application No. 2012421 dated Sep. 18, 2015.
Official Communication for Netherlands Patent Application No. 2012438 dated Sep. 21, 2015.
Official Communication for New Zealand Patent Application No. 622473 dated Jun. 19, 2014.
Official Communication for New Zealand Patent Application No. 622473 dated Mar. 27, 2014.
Official Communication for New Zealand Patent Application No. 622513 dated Apr. 3, 2014.
Official Communication for New Zealand Patent Application No. 628161 dated Aug. 25, 2014.
Official Communication for U.S. Appl. No. 13/827,491 dated Dec. 1, 2014.
Official Communication for U.S. Appl. No. 13/827,491 dated Jun. 22, 2015.
Official Communication for U.S. Appl. No. 13/827,491 dated Oct. 9, 2015.
Official Communication for U.S. Appl. No. 14/141,252 dated Apr. 14, 2016.
Official Communication for U.S. Appl. No. 14/141,252 dated Oct. 8, 2015.
Official Communication for U.S. Appl. No. 14/225,006 dated Sep. 10, 2014.
Official Communication for U.S. Appl. No. 14/225,006 dated Sep. 2, 2015.
Official Communication for U.S. Appl. No. 14/225,006 dated Dec. 21, 2015.
Official Communication for U.S. Appl. No. 14/225,006 dated Feb. 27, 2015.
Official Communication for U.S. Appl. No. 14/225,084 dated Sep. 11, 2015.
Official Communication for U.S. Appl. No. 14/225,084 dated Sep. 2, 2014.
Official Communication for U.S. Appl. No. 14/225,084 dated Feb. 20, 2015.
Official Communication for U.S. Appl. No. 14/225,084 dated Feb. 26, 2016.
Official Communication for U.S. Appl. No. 14/225,084 dated Jan. 4, 2016.
Official Communication for U.S. Appl. No. 14/225,160 dated Feb. 11, 2015.
Official Communication for U.S. Appl. No. 14/225,160 dated Aug. 12, 2015.
Official Communication for U.S. Appl. No. 14/225,160 dated Jun. 16, 2016.
Official Communication for U.S. Appl. No. 14/225,160 dated May 20, 2015.
Official Communication for U.S. Appl. No. 14/225,160 dated Apr. 22, 2016.
Official Communication for U.S. Appl. No. 14/225,160 dated Oct. 22, 2014.
Official Communication for U.S. Appl. No. 14/225,160 dated Jan. 25, 2016.
Official Communication for U.S. Appl. No. 14/225,160 dated Jul. 29, 2014.
Official Communication for U.S. Appl. No. 14/306,138 dated Dec. 24, 2015.
Official Communication for U.S. Appl. No. 14/306,138 dated Dec. 3, 2015.
Official Communication for U.S. Appl. No. 14/306,147 dated Dec. 24, 2015.
Official Communication for U.S. Appl. No. 14/319,161 dated Jan. 23, 2015.
Official Communication for U.S. Appl. No. 14/319,765 dated Feb. 1, 2016.
Official Communication for U.S. Appl. No. 14/451,221 dated Oct. 21, 2014.
Official Communication for U.S. Appl. No. 14/463,615 dated Sep. 10, 2015.
Official Communication for U.S. Appl. No. 14/463,615 dated Nov. 13, 2014.
Official Communication for U.S. Appl. No. 14/463,615 dated May 21, 2015.
Official Communication for U.S. Appl. No. 14/463,615 dated Jan. 28, 2015.
Official Communication for U.S. Appl. No. 14/463,615 dated Dec. 9, 2015.
Official Communication for U.S. Appl. No. 14/479,863 dated Dec. 26, 2014.
Official Communication for U.S. Appl. No. 14/483,527 dated Jun. 22, 2015.
Official Communication for U.S. Appl. No. 14/483,527 dated Jan. 28, 2015.
Official Communication for U.S. Appl. No. 14/483,527 dated Oct. 28, 2015.
Official Communication for U.S. Appl. No. 14/552,336 dated Jul. 20, 2015.
Official Communication for U.S. Appl. No. 14/562,524 dated Nov. 10, 2015.
Official Communication for U.S. Appl. No. 14/562,524 dated Sep. 14, 2015.
Official Communication for U.S. Appl. No. 14/571,098 dated Nov. 10, 2015.
Official Communication for U.S. Appl. No. 14/571,098 dated Mar. 11, 2015.
Official Communication for U.S. Appl. No. 14/571,098 dated Feb. 23, 2016.
Official Communication for U.S. Appl. No. 14/571,098 dated Aug. 24, 2015.
Official Communication for U.S. Appl. No. 14/571,098 dated Aug. 5, 2015.
Official Communication for U.S. Appl. No. 14/631,633 dated Sep. 10, 2015.
Official Communication for U.S. Appl. No. 14/676,621 dated Oct. 29, 2015.
Official Communication for U.S. Appl. No. 14/676,621 dated Jul. 30, 2015.
Official Communication for U.S. Appl. No. 14/746,671 dated Nov. 12, 2015.
Official Communication for U.S. Appl. No. 14/800,447 dated Dec. 10, 2015.
Official Communication for U.S. Appl. No. 14/813,749 dated Sep. 28, 2015.
Official Communication for U.S. Appl. No. 14/813,749 dated Apr. 8, 2016.
Official Communication for U.S. Appl. No. 14/842,734 dated Nov. 19, 2015.
Official Communication for U.S. Appl. No. 14/929,584 dated May 25, 2016.
Official Communication for U.S. Appl. No. 14/929,584 dated Feb. 4, 2016.
Open Web Analytics (OWA), <http://www.openwebanalytics.com/> Printed Jul. 19, 2013 in 5 pages.
Piwik—Free Web Analytics Software. <http://piwik.org/> Printed Jul. 19, 2013 in18 pages.
Psaltis, Andrew G., "Streaming Data—Designing the Real-Time Pipeline," Jan. 16, 2015, vol. MEAP VO3, pp. 0-12.
Sigrist, et al., "PROSITE, a Protein Domain Database for Functional Characterization and Annotation," Nucleic Acids Research, 2010, vol. 38, pp. D161-D166.

(56) References Cited

OTHER PUBLICATIONS

StatCounter—Free Invisible Web Tracker, Hit Counter and Web Stats, <http://statcounter.com/> Printed Jul. 19, 2013 in 17 pages.
TestFlight—Beta Testing on the Fly, <http://testflightapp.com/> Printed Jul. 18, 2013 in 3 pages.
Trak.io, <http://trak.io/> printed Jul. 18, 2013 in 3 pages.
UserMetrix, <http://usermetrix.com/android-analytics> printed Jul. 18, 2013 in 3 pages.
Valentini et al., "Ensembles of Learning Machines", M. Marinaro and R. Tagliaferri (Eds.): WIRN VIETRI 2002, LNCS 2486, pp. 3-20.
Vose et al., "Help File for ModelRisk Version 5," 2007, Vose Software, pp. 349-353. [Uploaded in 5 Parts].
Wang et al., "Research on a Clustering Data De-Duplication Mechanism Based on Bloom Filter," IEEE 2010, 5 pages.
Wikipedia, "Multimap," Jan. 1, 2013, https://en.wikipedia.org/w/index.php?title=Multimap&oldid=530800748.
Wikipedia, "Mobile Web," Jan. 23, 2015, retrieved from the internet on Mar. 15, 2016 https://en.wikipedia.org/w/index.php?title=Mobile_Web&oldid=643800164.
Windley, Phillip J., "The Live Web: Building Event-Based Connections in the Cloud," Dec. 21, 2011, pp. 10, 216.
Winkler, William E., "Bureau of the Census Statistical Research Division Record Linkage Software and Methods for Merging Administrative Lists," Statistical Research Report Series No. RR2001/03, Jul. 23, 2001, https://www.census.gov/srd/papers/pdf/rr2001-03.pdf, retrieved on Mar. 9, 2016.
Extended European Search Report for EP Appln. No. 17207019.5 dated Mar. 9, 2018, 7 pages.
Communication for EP Appln. No. 17207019.5 dated Apr. 4, 2019, 5 pages.

\* cited by examiner

FIGURE 2

INVESTIGATION: EXISTING ISSUES — 200

DEFECT TO ADD — 202

10001
Element:
Defect:

ISSUES — 204

Recommended | All Issues — 214

▽ ISSUE 514 — 212
21153
Part:
Defect:

21154
Part:
Defect:

15543
Part:
Defect:

92463
Part:
Defect:

△ ISSUE 014

SELECTED ISSUE: 514 — 206

ISSUE SUMMARY

Create New Issue | Add to Selected Issue — 216, 218

DESCRIPTION

SELECTED DEFECT: 21153

Created Date    2016-08-04

Location        Location A

Damage Type     Damage Z (75%)    29 (45%)

Product Identifier  29

Work Identifier  Work 1234567

Time of Detection  8:45 PM, 2016-08-04 (90%) — 208

Defect       Defect A (55%)

Cause        Cause A (35%)

Part         ABC123 (86%)

Material     Material 00000123 (24%)

Description  Description B (10%)

Other Field  ,

Mark as reviewed | View — 220, 222

KEYWORDS (##)

ABC? | BCD | 123 | EFG456
456 | Z3? | ZZZ3
!2!? | Z456B | ZZZ4
$-14 | 9216

Long Text | Defect File | Other Files

Keywords (11)  — 210

Long Text

View Raw — 224

FIGURE 2

INVESTIGATION: ISSUE BUILDER — 300

INVESTIGATIVE SET — 302

| 10001 | × |
| Part: | |
| Defect: | |

| 56125 | × |
| Part: | |
| Defect: | |

| 92123 | × |
| Part: | |
| Defect: | |

ADD DEFECT — 306

Recommended | All Leads

24153 — 316, 318
Part:
Defect:

44561
Part:
Defect:

INVESTIGATIVE SET SUMMARY — 304

Defects: 3
1 Product Identifier: 29
1 Damage Type: Damage Z

KEYWORDS (##) — 308

[Create Issue]

SELECTED DEFECT: 24153 — 310

| Created Date | 2016-07-13 | | Defect | Defect Z (0%) |
| Location | Location C (0%) | | Cause | Cause D (0%) |
| Damage Type | Damage C (0%) | | Part | ABC214 (100%) |
| Product Identifier | 28 (0%) | | Material | Material 00002423 (67%) |
| Work Identifier | Work Order 2435567 (0%) | | Description | Description G (0%) |
| Time of Detection | 7:09 AM, 2016-04-08 (0%) | | Other Field | – |

— 312  [View]

Long Text   Defect File   Other Files — 314

KEYWORDS (10)

Long Text — 320  [View Raw]

USER INTERFACE FOR MANAGING DEFECTS

CROSS REFERENCE TO RELATED APPLICATIONS

This application is a continuation of U.S. Ser. No. 15/448,155, filed Mar. 2, 2017, which claims the benefit under 35 U.S.C. § 119(e) of United States Provisional Application Ser. No. 62/436,967 filed Dec. 20, 2016, the content of which is incorporated by reference in its entirety into the present disclosure.

FIELD OF THE INVENTION

This disclosure relates to approaches for managing defect items.

BACKGROUND

Under conventional approaches, manufacturing process defects, such as deviation from requirements, are periodically recorded. For example, hundreds, or even thousands, of defects may be recorded daily for a particular manufacturing process, such as for the construction of buildings, cargo ships, consumer items, or other manufactured objects. Typically, defects are stored in a database which can be accessed by quality engineers or other users. However, existing interfaces are cumbersome and only provide limited access to defects. As a result, defects are often improperly identified or handled, and often become recurrent problems.

SUMMARY

Various embodiments of the present disclosure can include systems, methods, and non-transitory computer readable media configured to providing user interfaces for managing defect items. A defect selection interface may be displayed. The defect selection interface may include a first set of defect items for selection by a user. The first set of defect items may include a first defect item. The defect selection interface may include one or more first visuals indicating similarity of the first set of defect items to other defect items.

Responsive to the user's selection of the first defect item from the first set of defect items, an issue selection interface may be displayed. The issue selection interface may include a first set of issue items for selection by the user. The first set of issue items may include a first issue item. The first issue item may include one or more defect items added to the first issue item.

In some embodiments, one or more first visuals may indicate similarity of the first set of defect items to the other defect items based on shape of the one or more first visuals. In some embodiments, one or more first visuals may indicate similarity of the first set of defect items to the other defect items based on color of the one or more first visuals.

Responsive to the user's selection of the first issue item from the first set of issue items, a defect comparison interface may be displayed. In some embodiment, the user's selection of the first issue item from the first set of issue items may include the user's selection of at least one of the one or more defect items added to the first issue item. The defect comparison interface may include a comparison of the first defect item to the first issue item. The comparison of the first defect item to the first issue item may include a comparison of the first defect item to the one or more defect items added to the first issue item and selected by the user. The defect comparison interface may include one or more second visuals indicating similarity of the first defect item to the first issue item. Responsive to receiving the user's selection of the first issue item as an issue item to add the first defect item, the first defect item may be added to the first issue item.

In some embodiments, one or more second visuals may indicate similarity of the first defect item to the first issue item based on color of the one or more second visuals. In some embodiments, one or more second visuals may indicate similarity of the first defect item to the first issue item based on one or more percentage indicators. In some embodiments, one or more percentage indicators may be displayed on the defect comparison interface in response to a mouseover.

In some embodiments, responsive to receiving the user's selection of a new issue item as the issue item to add the first defect item, an issue builder interface may be displayed. The issue builder interface may include a second set of defect items for selection by the user. The second set of defect items may include a second defect item. The issue builder interface may include one or more third visuals indicating similarity of the first defect item to the second set of defect items. Responsive to receiving the user's selection of the second defect item as an additional defect item to add to the new issue item, the second defect item may be added to the new issue item.

In some embodiments, responsive to receiving the user's selection of sharing an issue item (e.g., first issue item, new issue item) with one or more other users, a sharing interface may be displayed. The sharing interface may include a set of other users for selection by the user. The set of other users may be determined based on the one or more defect items added to the issue item.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

FIG. 2 illustrates an example issue selection interface and defect comparison interface, in accordance with various embodiments.

FIG. 3 illustrates an example issue builder interface, in accordance with various embodiments.

FIG. 4 illustrates an example reviewing interface, in accordance with various embodiments.

DETAILED DESCRIPTION

Figure 1:
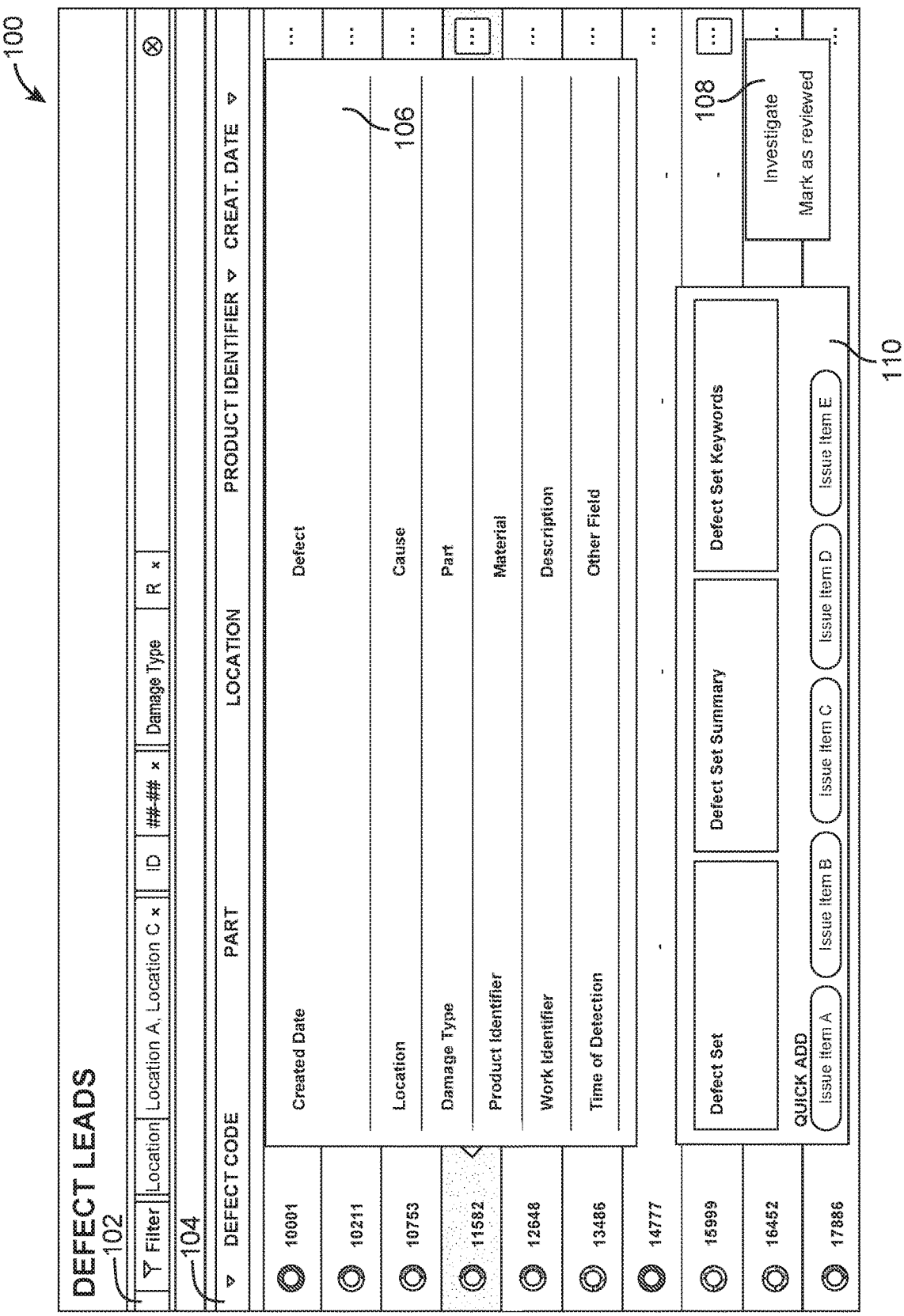
FIG. 1 illustrates an example defect selection interface, in accordance with various embodiments.

A claimed solution rooted in computer technology overcomes problems specifically arising in the realm of computer technology. In various implementations, a system can provide user interfaces for managing defects. A defect selection interface may include a first set of defect items for selection by a user. The defect selection interface may allow the user to filter on this first set of defect items by both structured and unstructured parameters. The defect selection interface may include one or more first visuals indicating similarity of the first set of defect items to other defect items. The defect selection interface may allow the user to prioritize based on the similarity of the defect items or the recurrence of defect items. Responsive to the user's selection of a first defect item or multiple defect items from the first set of defect items, an issue selection interface may be displayed. The issue selection interface may include a set of issue items for selection by the user. Individual issue items may include one or more defect items added to the individual issue items. Individual issue items may include one or more defect items that are similar to the set of selected multiple defect items. Responsive to the user's selection of a first issue item from the set of issue items, a defect comparison interface may be displayed. The defect comparison interface may include a comparison of the first defect item or the multiple defect items to the first issue item. The defect comparison interface may include one or more second visuals indicating similarity of the first defect item or the multiple defect items to the first issue item. Based on the user's selection, the first defect item or multiple defect items may be added to the issue item.

In some embodiments, responsive to receiving the user's selection of a new issue item as the issue item to add the first defect item, an issue builder interface may be displayed. The issue builder interface may include a second set of defect items for selection by the user. The issue builder interface may include one or more third visuals indicating similarity of the first defect item to the second set of defect items. Based on the user's selection, a second defect item from the second set of defect items may be added to the new issue item.

Defect items may refer to deviation from specification(s), standard(s), expectation(s), and/or requirement(s) for a manufacturing process, such as for the construction of buildings, cargo ships, consumer items, and/or other manufactured objects. Defect items may be grouped into one or more issue items. Defect items may be entered into one or more databases during and/or after detection of the defect items. For example, during an inspection of a manufacturing line/process for a consumer object, an engineer may detect a faulty component/process. The engineer may gather data about the faulty component/process (e.g., location of fault, type of fault, materials involved, description of fault, photo/video of fault, etc.). The gathered data may be entered into one or more databases after the inspection (e.g., the engineer inputs the data into a defect entry application running on a computing station) or during the inspection (e.g., the engineer inputs the data into a defect entry application running on a mobile device).

As another example, the engineer may be running a defect entry application on a mobile device (e.g., phone, tablet). During the inspection of the manufacturing line/process, the engineer may detect and gather information about defect items. Using the defect entry application on the mobile device, the engineer may create new defect items and/or edit existing defect items. For individual defect items, the engineer may enter one or more information into different fields that identifies different properties of the defect item, such as location of the defect, defect rating, product identifier, location of the defect in the product, affected part/section, relevant industry/standards, work identifier (e.g., work order form number), time of detection, responsible personnel/group, description, photo, audio, video, and/or other properties of the defect item. Information about the defect items may be recorded as free text, using set codes/terms, and/or in multiple languages. Information about the defect items may be recorded periodically or non-periodically. The entered information may be added to a database running in a server when the mobile device/defect entry application syncs with the server. The syncing may be performed on a periodic basis, upon completion of entering information about a defect item, and/or based on manual command for syncing.

FIGS. 1-4 illustrate example user interfaces for managing defect items, in accordance with various embodiments. In some embodiments, these interfaces may be accessed as part of a workflow for visualizing defects/issue items. In various embodiments, these user interfaces may be accessed through a software application running on a computing device (e.g., computers, mobile phones, tablets, etc.) that includes one or more processors and memory. For example, the user interfaces may be accessible through a web browser. In another example, the user interfaces may be provided through a data analysis application. In yet another example, the user interfaces may be provided as a service over a network (e.g., software as a service). Depending on the computing device, the user may be able to interact with the user interfaces using various input devices (e.g., keyboard, mouse, etc.) and/or touch gestures. These user interfaces are provided merely as examples and, naturally, the arrangement and configuration of such interfaces can vary depending on the implementation. Thus, depending on the implementation, the user interfaces may include additional features and/or alternative features.

FIG. 1 illustrates an example user interface 100 for selecting defect items. In some embodiments, the user interface 100 may be presented through a display screen of a computing device. Further, the user interface 100 may be provided through an application (e.g., web browser, data analysis application, etc.) running on the computing device. In some embodiments, a data analysis platform can be configured to utilize various generally known data processing engines and/or techniques to enable the functionality described in reference to the user interface 100. The computing device through which the user interface 100 is being accessed can interact with the data analysis platform to enable such functionality.

As shown, the user interface 100 includes filter options 102 and defect selection interface 104. The filter options 102 may enable users to select one or more options to filter the list of defect items displayed in the defect selection interface 104. Filter options may include one or more properties by which defect items may be categorized. The user interface

100 may allow the users to filter the list of defect items by structured and/or unstructured parameters. In some implementations, a user may be able to save/set a certain selection of filter options to be used as a default. For example, a user may set the selection of filter options shown in FIG. 1 as a default. When the user logs off and logs back into the system, the default filter options may automatically be applied.

The defect selection interface 104 may include one or more defect items for selection by the user. For example, in FIG. 1, the defect selection interface 104 displays ten defect items (defect codes 10001, 10211, 10753, 11582, 12648, 13486, 14777, 15999, 16452, 17886). The defect items may be sorted based on one or more properties of the defect items (e.g., based on defect codes, part, etc.). The defect items may be sorted based on the probability of finding similar defect items.

The defect selection interface 104 may include information about the listed defect items. For example, as shown in FIG. 1, the defect selection interface 104 may display the defect code, the part involved with the defect item, the relevant location (e.g., manufacturing location, location of the part), the product identifier (e.g., manufacturer's serial number), and the creation date for the defect item. Other information about the defect items may be displayed.

In some implementations, the type of information displayed in the defect selection interface 104 may be changed based on user selection. For example, the user may choose to add or remove a type of information displayed in the defect selection interface 104. As another example, the type of information displayed in the defect selection interface 104 may correspond to the filter options selected by the user. For example, a user's selection of a range of product identifiers using filter options 102 may trigger the displaying of product identifiers in the defect selection interface 104.

The defect selection interface 104 may include one or more visuals that indicate similarity of displayed defect items to other defect items. Visuals may indicate the similarity of displayed defect item to other defect items using shape, color, text, and/or other visuals. For example, a defect item with higher similarity to other defect items may be shown with a different shape (e.g., icon) than a defect item with lower similarity. A defect item with higher similarity to other defect items may be shown with a different color (e.g., color of icon, color text of defect codes) than a defect item with lower similarity. A defect item with higher similarity to other defect items may be shown with a different additional text (e.g., percentage indicator) than a defect item with lower similarity. The additional text may be displayed inline with the defect item (e.g., inline with defect codes) or may be displayed based on a mouseover—user's hovering a mouse icon over the defect item (e.g., defect code) for a duration of time.

For example, in FIG. 1, the defect items listed in the defect selection interface 104 may include an indicator, e.g., circular icon, to the left of the defect item identification number. The amount by which the indicator is filled may indicate the similarity of the individual defect items to other defect items. For example, the full circle next to defect item 10001 may indicate a higher chance of finding similar defect items than the partial circles next to defect items 10211 or 13486. As another example, the color of the indicator next to defect item 10001 may indicate a higher chance of finding similar defect items than the colors of circles next to defect items 10211 or 13486. The defect selection interface 104 may allow the user to prioritize the listed defect items based on the similarity of the defect items or the recurrence of defect items. Prioritizing the list of defect items may change the order in which the defect items appear in the listing.

The defect selection interface 104 may enable the user to select one or more defect items listed on the defect selection interface 104. Users may use options 108 to investigate the selected defect item(s) or mark the defect item(s) as being reviewed. Selection by a user to investigate one or more defect items may cause the user interface 100 to be updated and/or transitioned to another interface, as illustrated in example of FIG. 2, by which the defect item(s) may be investigated. In some implementations, a user may address individual defect items and mark them as being resolved individually, rather than grouping defect items into issue items. In some implementations, a user may address individual defect items by addressing issue items that have one defect item.

In some implementations, a reviewed defect item may be removed from the list of defect items in the defect selection interface 104. In some implementations, a reviewed defect item may be displayed differently from non-reviewed defect items in the defect selection interface 104. For example, a reviewed defect item may be shown with a particular icon, shown in particular text/color, and/or with other visuals to indicate that the defect item has been reviewed. Marking of a defect item as having been reviewed may be specific to the user. For example, user A's marking of a defect item may not affect user B's viewing of the defect items.

In some implementations, the defect selection interface 104 may include additional information/visuals that indicate the source of the defect items. The defect selection interface 104 may include visuals that indicate whether the particular defect items were entered into the database from a desktop application or a mobile application. For example, based on a defect item having been entered from a mobile application, the defect selection interface 104 may display a mobile icon next to the defect item. In some implementations, the defect selection interface 104 may display information about the source of the defect item in response to a mouseover. For example, in response to a user hovering the mouse icon over a defect item for a duration, the defect selection interface 104 may display a message indicating whether the defect item was created from a desktop application or a mobile application.

In some implementations, the defect selection interface 104 may include one or more options/interfaces for allowing a user to add one or more defects items to one or more issue items without leaving the defect selection interface 104 (e.g., quick-add functionality). For example, in response to a user's selection of one or more defect items from the defect selection interface 104, the defect selection interface 104 may provide a quick-add interface 110 for the users to add the selected defect item(s) to one or more issue items. The quick-add interface 110 may display a listing, a summary, keywords, and/or other information about the defect item(s) selected by the user (defect set). The quick-add interface 110 may list one or more recommended issues (e.g., identified as discussed below) into which the users may add the selected defect item(s). Top recommended issue items (e.g., five top recommended issue items) may be provided for selection by the users to add the selected defect item(s).

In some implementations, the defect selection interface 104 may include one or more options/interfaces (e.g., shopping cart) for allowing a user to gather selected defect items. A user may select one or more defect items for inclusion in the shopping cart and then change the listing of defect items in the defect selection interface 104 (e.g., by changing a filter). The user may select additional defect items for inclusion in the shopping cart without changing the defect items included in the shopping cart. The user may remove one or more defect items from the shopping cart.

In some implementations, the user interface 100 may include defect detail interface 106. The defect detail interface 106 may be displayed in response to a user's selection of a defect item and/or based on a mouseover—user's hovering a mouse icon over the defect item (e.g., defect code) for a duration of time. The defect detail interface 106 may include more detailed information about the defect item than is displayed on the listing of defect items. For example, as shown in FIG. 1, the defect detail interface 106 may include details about defect item 11582 beyond the defect code, the part involved with the defect item, the relevant location, the product identifier, and the creation date for the defect item. The defect detail interface 106 may include information not shown/different from information shown in FIG. 1. The defect detail interface 106 may provide a preview of the defect item. In some implementations, the defect details interface 106 may provide a preview, link, or entirety of items (e.g., photo, audio, video, documents) recorded for or associated with the defect item. For example, the defect details interface 106 may provide a view of defect documents/files, which may assist users in identifying recurrence of defects (e.g., types of defects, cause of defects, etc.).

FIG. 2 illustrates an example user interface 200 for adding defect items to existing issues. In some embodiments, the user interface 200 may be presented through a display screen of a computing device. Further, the user interface 200 may be provided through an application (e.g., web browser, data analysis application, etc.) running on the computing device. In some embodiments, a data analysis platform can be configured to utilize various generally known data processing engines and/or techniques to enable the functionality described in reference to the user interface 200. The computing device through which the user interface 200 is being accessed can interact with the data analysis platform to enable such functionality.

The user interface 200 may be displayed in response to a user's selection of one or more defect items for investigation. As shown, the user interface 200 includes defect-to-add interface 202, issue selection interface 204, selected issue information interface 206, defect comparison interface 208, and selected defect information interface 210. The defect-to-add interface 202 may display information on the defect item(s) selected by the user for investigation (e.g., defect item 10001). Issue selection interface 204 may include a list of issue items for selection by the user. For example, as shown in FIG. 2, the issue selection interface 204 displays issue items 514 and 014. The issue items displayed in the issue selection interface 204 may include one or more defect items added to the issue items. Individual issue items may include one or more defect items that are similar to the set of selected multiple defect items. Clicking on an issue item may display the defect items added to the issue item. For example, as shown in FIG. 2, the user may have selected issue item 514 and the issue selection interface 204 may display the defect items 21153, 21154, 15543, and 92463 added to the issue item 514.

The issue selection interface 204 may include options 212, 214 for users to see (1) recommended issue items, or (2) all issue items. In other embodiments, not shown in FIG. 2, issue selection 204 may include other or additional options, including creating new filters or applying saved filters to the list of issue items. All issue items may include issue items to which the defect item(s) selected by the user for investigation may be added. Recommended issue items may include issue items which the system recommends to which the defect item(s) selected by the user for investigation may be added. The recommended issue items may be automatically determined based on one or more properties of the defect item(s) selected by the user for investigation. The system may analyze the similarities between the properties of the defect item(s) selected by the user for investigation and the properties of the issue items/defect items added to issue item. The recommended issue items may include issue items with defect items having properties that match/more closely match the properties of the defect item(s) selected by the user for investigation.

The selected issue information interface 206 may provide information about the issue item selected from the issue selection interface 204. For example, as shown in FIG. 2, the selected issue information interface 206 may provide summary, keywords, and description of the selected issue item. The degree of similarity between the keywords of defect items within the selected issue item or the degree of similarity between the keywords of the selected issue item and the keywords of the defect item(s) selected by the user for investigation may be shown using one or more visuals. For example, the degree of similarity between the keywords of the selected issue item (e.g., issue item 514) and the keywords of the defect item(s) selected by the user for investigation (e.g., defect item 10001) may be indicated with different shape, different color, different font, different/additional text (e.g., percentage indicator), and/or other visuals. For example, in FIG. 2, the degree of similarity between the keywords of the selected issue item and the keywords of the defect item(s) selected by the user for investigation may be indicated by the color of the bubbles behind the keywords. The selected issue information interface 206 may include information not shown/different from information shown in FIG. 2.

The defect comparison interface 208 may be displayed in response to the user's selection of an issue from the issue selection interface 204. In some embodiment, the user's selection of an issue item from the issue selection interface 204 may include the user's selection of one or more defect items added to the issue item. For example, as shown in FIG. 2, the user's selection of issue 514 may include the user's selection of defect item 21153 within issue item 514. The defect comparison interface 208 may include a comparison of the selected defect item(s) within the issue item (e.g., defect item 21153) to the other defect items in the issue item (e.g., items 21154, 15543, 94263). In response to the selection of one or more defect items in the investigate set (shown in the defect-to-add interface 202), user interface 200 may display a comparison between the selected defect item(s) and the selected issue item (e.g., issue item 514). For example, as shown in FIG. 2, the defect comparison interface 208 may include a comparison of the defect item 21153 with defect items 21154, 15543, and 92463. The defect comparison interface 208 may include information not shown/different from information shown in FIG. 2.

The defect comparison interface 208 may include one or more visuals that indicate similarity of the defect item(s) selected by the user for investigation (e.g., defect item 10001) with the defect items within selected issue item (e.g., defect items 21153, 21154, 15543, 92463)/selected defect item within the issue item (e.g., defect item 21153). Visuals may indicate the similarity between the defect items/issue items using shape, color, text, and/or other visuals. For example, the degree of similarity between the properties of the defect item(s) selected by the user for investigation (e.g., defect item 10001) and the properties of the selected issue item (e.g., issue item 514)/selected defect item within the issue item (e.g., defect item 21153) may be indicated with different shape, different color, different font, different/additional text (e.g., percentage indicator), and/or other visuals. The additional text may be displayed inline with the relevant property of the defect item or may be displayed based on a mouseover.

The user may use option 220 to mark the selected defect item as having been reviewed. A reviewed defect item may be displayed differently from non-reviewed defect items in the issue selection interface 204. For example, a reviewed defect item may be shown with a particular icon, shown in particular text/color, and/or with other visuals to indicate that the defect item has been reviewed. Marking of a defect item as having been reviewed may be specific to the user. For example, user A's marking of a defect item may not affect user B's viewing of the defect items. The user may use option 222 to view detailed/other information about the selected defect item.

The selected defect information interface 210 may include detailed information about the selected defect item. For example, as shown in FIG. 2, the selected defect information interface 210 may include detailed information about defect item 21153. The selected defect information interface 210 may include option 224 by which the user may view raw information about the selected defect item. The degree of similarity between the keywords of the selected defect item and the keywords of the defect item(s) selected by the user for investigation may be shown using one or more visuals. For example, the degree of similarity between the keywords of the selected defect item (e.g., defect item 21153) and the keywords of the defect item(s) selected by the user for investigation (e.g., defect item 10001) may be indicated with different shape, different color, different font, different/additional text (e.g., percentage indicator), and/or other visuals. For example, in FIG. 2, the degree of similarity between the keywords of the selected defect item and the keywords of the defect item(s) selected by the user for investigation may be indicated by the color of the bubbles behind the keywords (not shown). The selected defect information interface 210 may include information not shown/different from information shown in FIG. 2.

Users may use options 216, 218 to add the defect item(s) selected by the user for investigation to an existing issue or a new issue. For example, as shown in FIG. 2, the user may use option 218 to add the defect item 10001 to the issue 514. The user may use option 216 to add the defect item 10001 to a new issue. Selection by the user to add defect item(s) to a new issue may cause the user interface 200 to be updated and/or transitioned to another interface, as illustrated in example of FIG. 3, by which the defect item(s) may be added to a new issue.

FIG. 3 illustrates an example user interface 300 for adding defect items to a new issue. In some embodiments, the user interface 300 may be presented through a display screen of a computing device. Further, the user interface 300 may be provided through an application (e.g., web browser, data analysis application, etc.) running on the computing device. In some embodiments, a data analysis platform can be configured to utilize various generally known data processing engines and/or techniques to enable the functionality described in reference to the user interface 300. The computing device through which the user interface 300 is being accessed can interact with the data analysis platform to enable such functionality.

The user interface 300 may be displayed in response to a user's selection of adding one or more defect items to a new issue item. As shown, the user interface 300 includes investigative set interface 302, investigative set information interface 304, add defect interface 306, defect comparison interface 310, and selected defect information interface 314. The investigative set interface 302 may display information on the defect items selected to be added to a new issue item ("investigative set"). For example, as shown in FIG. 3, the investigative set interface 302 displays defect items 10001, 56125, and 92123, which are selected to be added to a new issue item.

The investigative set information interface 304 may include detailed information about the defect items in the investigative set. For example, as shown in FIG. 3, the investigative set information interface 304 includes summary of and keywords in the defect items 10001, 56125, and 92123. The information presented in the investigative set information interface 304 may change as defect items are added to and/or removed from the investigative set. The degree of similarity between the keywords of the defect item(s) in the investigative set or the degree of similarity between the keywords of the defect item(s) in the investigative set and the keywords of the defect item(s) selected by the user for potential addition into the investigative set may be shown using one or more visuals. For example, the degree of similarity between the keywords of the defect item(s) in the investigative set and the keywords of the defect item(s) selected by the user for potential addition into the investigative set may be indicated with different shape, different color, different font, different/additional text (e.g., percentage indicator), and/or other visuals. For example, in FIG. 3, the degree of similarity between the keywords of the defect item(s) in the investigative set and the keywords of the defect item(s) selected by the user for potential addition into the investigative set may be indicated by the color of the bubbles behind the keywords (not shown). The investigative set information interface 304 may include information not shown/different from information shown in FIG. 3.

The add defect interface 306 may include a list of defect items for selection by the user. A user may select one or more defect items from the list to view a comparison (e.g., using defect comparison interface 310) between the selected defect item(s) and the defect items within the investigative set. The add defect interface 306 may include options 316, 318 for users to see (1) recommended defect items, or (2) all defect items. In other embodiments, not shown in FIG. 3, add defect interface 306 may include other or additional options, including creating new filters or applying saved filters to the list of defect items. All defect items may include defect items which may be added to the investigative set. Recommended defect items may include defect items which the system recommends for adding to the investigative set. The recommended defect items may be automatically determined based on one or more properties of the defect item(s) within the investigative set. The system may analyze the similarities between the properties of the defect item(s) within the investigative set and the properties of other defect items. The recommended defect items may include defect items having properties that match/more closely match the properties of the defect item(s) within the investigative set. The recommended defect items may be dynamically determined such that as defect items are added/removed from the investigative set, the listing of recommended defect items in the add defect interface 306 is changed.

The user may use one or more buttons/commands to add a selected defect item to the investigative set. For example, the user may "+" icons or other buttons in the add defect interface 306 to add particular defect items to the investigative set. As another example, user interface 300 may include a dedicated button to add a selected defect item to the investigative set. The user may use one or more buttons/ commands to remove a defect item from the add defect interface 306. For example, the user may use "−" icons or other buttons in the add defect interface 306 to remove particular defect items from the add defect interface 306.

The defect comparison interface 310 may include a comparison of the defect item selected from the add defect interface 306 and the defect items within the investigative set. For example, as shown in FIG. 3, the defect comparison interface 310 may include a comparison of defect item 24153 with the defect items within the investigative set (e.g., defect items 10001, 56125, 92123). The defect comparison interface 310 may include information not shown/different from information shown in FIG. 3. The users may use option 312 to view detailed/other information about the defect item selected from the add defect interface 306.

The defect comparison interface 310 may include one or more visuals that indicate similarity of the defect item selected from the add defect interface 306 with the defect items within the investigative set. Visuals may indicate the similarity between the defect items using shape, color, text, and/or other visuals. For example, the degree of similarity between the properties of the defect item selected from the add defect interface 306 and the defect items within the investigative set may be indicated with different shape, different color, different font, different/additional text (e.g., percentage indicator), and/or other visuals. The additional text may be displayed inline with the relevant property of the defect item or may be displayed based on a mouseover.

The selected defect information interface 314 may include detailed information about the defect item selected from the add defect interface 306. For example, as shown in FIG. 3, the selected defect information interface 314 may include detailed information about defect item 24153. The selected defect information interface 314 may include option 320 by which the user may view raw information about the selected defect item. The degree of similarity between the keywords of the selected defect item and the keywords of the defect item(s) within the investigative set may be shown using one or more visuals. For example, the degree of similarity between the keywords of the selected defect item (e.g., defect item 24153) and the keywords of the defect item(s) within the investigative set (e.g., defect items 10001, 56125, 92123) may be indicated with different shape, different color, different font, different/additional text (e.g., percentage indicator), and/or other visuals. For example, in FIG. 3, the degree of similarity between the keywords of the selected defect item and the keywords of the defect item(s) within the investigative text may be indicated by the color of the bubbles behind the keywords (not shown). The selected defect information interface 314 may include information not shown/different from information shown in FIG. 3.

The user may use option 308 to create a new issue from the defect items in the investigative set. Selection by a user to create a new issue item may cause the user interface 300 to be updated and/or transitioned to another interface, as illustrated in example of FIG. 4, by which the issue item may be reviewed.

Figure 4:
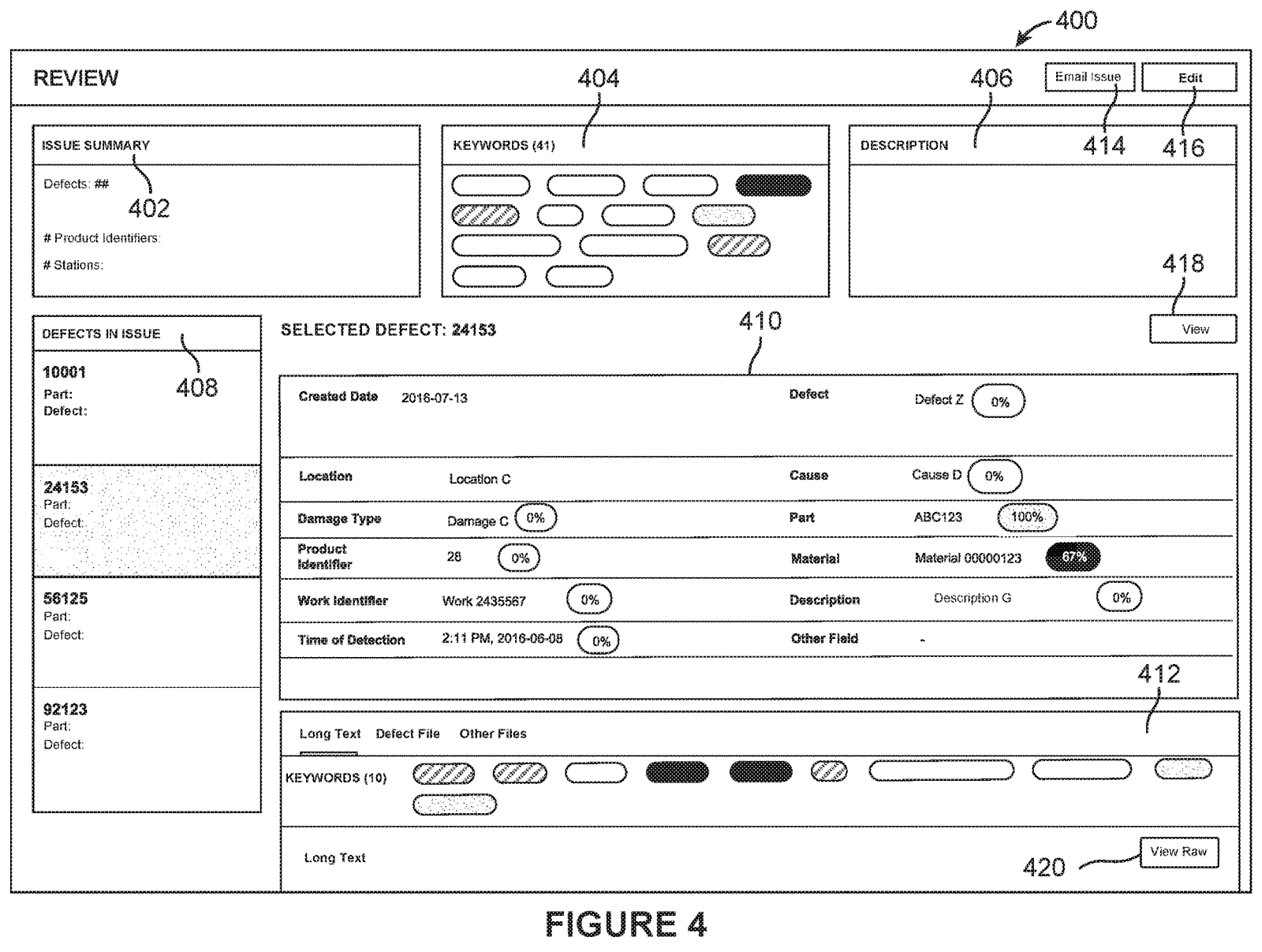

FIG. 4 illustrates an example user interface 400 for reviewing issues items. In some embodiments, the user interface 400 may be presented through a display screen of a computing device. Further, the user interface 400 may be provided through an application (e.g., web browser, data analysis application, etc.) running on the computing device. In some embodiments, a data analysis platform can be configured to utilize various generally known data processing engines and/or techniques to enable the functionality described in reference to the user interface 400. The computing device through which the user interface 400 is being accessed can interact with the data analysis platform to enable such functionality.

As shown, the user interface 400 includes issue summary interface 402, keywords interface 404, description interface 406, defects in issue interface 408, defect comparison interface 410, and selected defect information interface 412. The issue summary interface 402 may display information on the defect item(s) included in the issue item. The description interface 406 may display description of the issue item/ defect items included in the issue item. The defects in issue interface 408 may display a listing of defect included in the issue item.

The keywords interface 404 may display information on keywords of the defect item(s) included in the issue item. The degree of similarity between the keywords of the defect item(s) in the issue item or the degree of similarity between the keywords of the defect item(s) in the issue item and the keywords of the defect item(s) selected from the defects in issue interface 408 may be shown using one or more visuals. For example, the degree of similarity between the keywords of the defect item(s) in the issue item and the keywords of the defect item(s) selected from the defects in issue interface 408 may be indicated with different shape, different color, different font, different/additional text (e.g., percentage indicator), and/or other visuals. For example, in FIG. 4, the degree of similarity between the keywords of the defect item(s) in the issue item and the keywords of the defect item(s) selected from the defects in issue interface 408 may be indicated by the color of the bubbles behind the keywords (not shown).

The defect comparison interface 410 may include a comparison of the defect item selected from the defects in issue interface 408 and the defect item(s) within the issue item. For example, as shown in FIG. 4, the defect comparison interface 410 may include a comparison of defect item 24153 with the defect items within the issue item. The comparison of a particular defect item within an issue item with the issue item may include (1) a comparison of the particular defect item with all defect items within the issue item, or (2) a comparison of the particular defect item with other defect items within the issue item. The defect comparison interface 410 may include information not shown/ different from information shown in FIG. 4.

The defect comparison interface 410 may include one or more visuals that indicate similarity of the defect item selected from the defects in issue interface 408 with the defect items within the issue item. Visuals may indicate the similarity between the defect items using shape, color, text, and/or other visuals. For example, the degree of similarity between the properties of the defect item selected from the defects in issue interface 408 and the defect items within the issue item may be indicated with different shape, different color, different font, different/additional text (e.g., percentage indicator), and/or other visuals. The additional text may be displayed inline with the relevant property of the defect item or may be displayed based on a mouseover. The users may use option 418 to view detailed/other information about the defect item selected from the defects in issue interface 408.

The selected defect information interface 412 may display detailed information about the defect item selected from the defects in issue interface 408. The selected defect information interface 412 may include option 420 by which the user may view raw information about the selected defect item. The degree of similarity between the keywords of the selected defect item and the keywords of the defect item(s) within the issue item may be shown using one or more visuals. For example, the degree of similarity between the keywords of the selected defect item (e.g., defect item 24153) and the keywords of the defect item(s) within the issue item (e.g., defect items 10001, 56125, 92123; defect items 10001, 24153, 56125, 92123) may be indicated with different shape, different color, different font, different/additional text (e.g., percentage indicator), and/or other visuals. For example, in FIG. 4, the degree of similarity between the keywords of the selected defect item and the keywords of the defect item(s) within the issue item may be indicated by the color of the bubbles behind the keywords (not shown). The selected defect information interface 412 may include information not shown/different from information shown in FIG. 4.

In some implementations, a user may select one or more options (e.g., option 414) to share an issue item (e.g., a newly created issue item, an existing issue item) with other user(s). Selection by the user to share issue item(s) with other user(s) may cause the user interface (e.g., 400) to be updated and/or transitioned to another interface by which the issue item(s) may be shared with other user(s). The sharing interface may include one or more listing of other users with whom an issue item may be shared. The sharing interface may enable the user to select one or more other users to share the issue item. The listing of other users may include all users with whom the user may share the issue item. The listing of other users may include other users with whom the system recommends that the user share the issue item. For example, the system may generate the listing of recommended other users with whom the user may share the issue items based on the properties of the issue item/defect items within the issue item. The system may analyze the similarities between the properties of the defect item(s) within the issue items and the properties of defect items that are relevant to other users to determine which of the other users may be interested in the issue item selected by the user. For example, a user may choose to share the issue item shown in FIG. 4. The system may analyze properties of defect items within the issue item (e.g., defect items 10001, 24153, 56125, 92123) and determine which other users have issue items with similar properties.

In some implementations, a user may select one or more options (e.g., option 416) to change the issue item. Selection by a user to change the issue item may cause the user interface 400 to be updated and/or transitioned to another interface, as illustrated in example of FIG. 3, by which the issue item may be changes (e.g., defect items added or removed).

Figure 5:
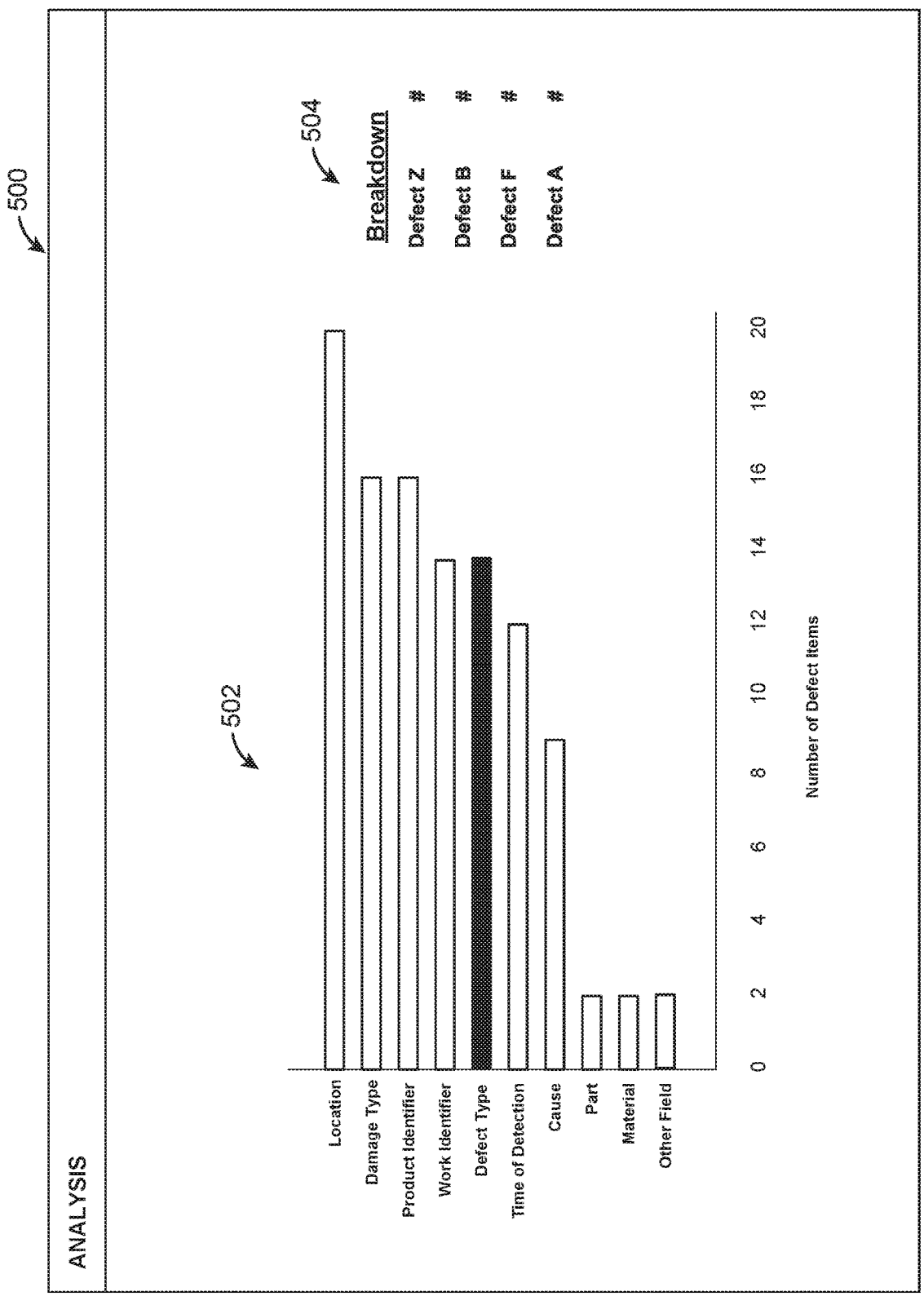
FIG. 5 illustrates an example analysis interface, in accordance with various embodiments.

FIG. 5 illustrates an example user interface 500 for analyzing defect items/issue items. In some embodiments, the user interface 500 may be presented through a display screen of a computing device. Further, the user interface 500 may be provided through an application (e.g., web browser, data analysis application, etc.) running on the computing device. In some embodiments, a data analysis platform can be configured to utilize various generally known data processing engines and/or techniques to enable the functionality described in reference to the user interface 500. The computing device through which the user interface 500 is being accessed can interact with the data analysis platform to enable such functionality.

The user interface 500 may be displayed in response to a user's selection of option(s) for analyzing defect items/issue items. As shown, the user interface 500 includes a defect item analysis region 502 and a detailed defect item analysis region 504. The defect item analysis region 502 may display a summary of information about a grouping of defect items (e.g., defect items within an issue, defect items matching one or more filter criteria, defect items selected by a user). For example, as shown in FIG. 5, the defect item analysis region 502 provides a bar chart displaying the number of defect items that include values for different defect item properties (e.g., defect item fields). For example, fourteen defect items within an issue may include values for defect type. The bar chart may be sorted based by most frequent values of the defect item properties, alphabetically, or based on other information. The defect item analysis region 502 may provide a bar chart for all defect item properties or a certain number of top defect item properties (e.g., top ten defect item properties).

A user may select one or more items (e.g., defect item properties, bars) within the defect item analysis region 502 to see more detailed information about the selected item(s). The detailed defect item analysis region 504 may provide detailed information relating to the item(s) selected within the defect item analysis region 502. For example, as shown in FIG. 5, the detailed defect item analysis region 504 provides a breakdown of the types of defects within an issue based on the user's selection of "Defect Type" or the bar representing the number of defect types within the issue. The listing of defect types within the detailed defect item analysis region 504 may be sorted based on the most frequent type of the defect item, alphabetically, or based on other information. The user interface 500 may include information not shown/different from information shown in FIG. 5. For example, the user interface 500 may include information relating to defect item set within an issue, summary of defect item set within an issue, keywords relating to defect item set within an issue, and/or other information.

Figure 6:
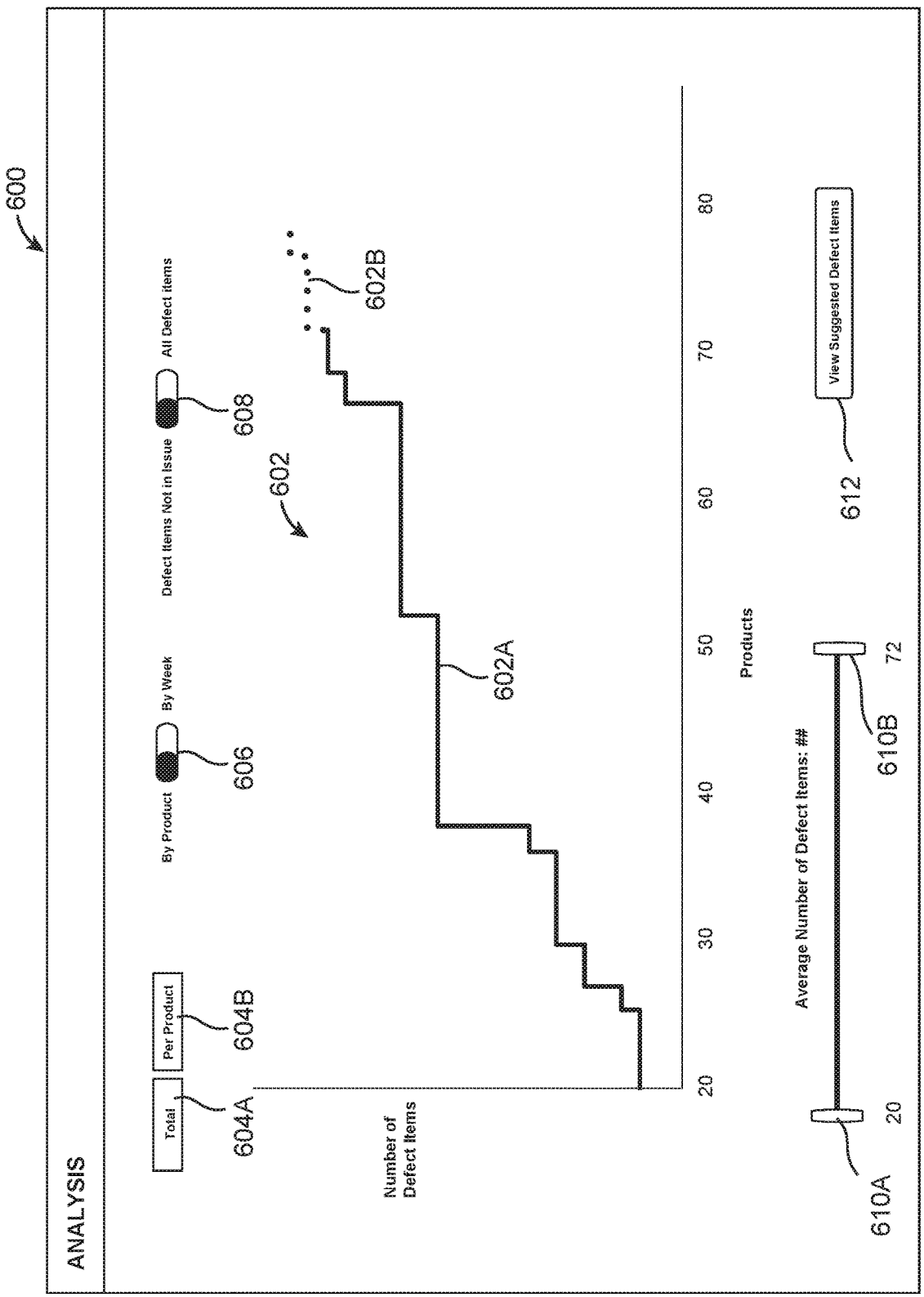
FIG. 6 illustrates an example analysis interface, in accordance with various embodiments.

FIG. 6 illustrates an example user interface 600 for analyzing defect items/issue items. In some embodiments, the user interface 600 may be presented through a display screen of a computing device. Further, the user interface 600 may be provided through an application (e.g., web browser, data analysis application, etc.) running on the computing device. In some embodiments, a data analysis platform can be configured to utilize various generally known data processing engines and/or techniques to enable the functionality described in reference to the user interface 600. The computing device through which the user interface 600 is being accessed can interact with the data analysis platform to enable such functionality.

The user interface 600 may be displayed in response to a user's selection of option(s) for analyzing defect items/issue items. As shown, the user interface 600 includes a defect item analysis region 602. The defect item analysis region 602 may display a number of defect items associated with products. For example, as shown in FIG. 6, the defect item analysis region 602 provides a graph 602A displaying the total number of defect items detected between twenty products and seventy-two products. The defect item analysis region 602 provides a graph 602B displaying the number of suggested defect items for the products/issue. The suggested defect items may be determined as described above. The suggested defect items may be determined based on analysis of defects identified for the products, defects within an issue, and/or other grouping of defect items. The suggested defect items may be determined based on analysis of a number of products meeting a threshold (e.g., two most recent products). Determining suggested defect items based on the most recent products enables users to review potential defect items that may be tied to the issue while avoiding defect items related to already resolved defect items. The user interface 600 include option 612 that enables a user to view the suggested defect items.

The user interface 600 may include one or more options to modify the graph(s) within the defect item analysis region 602. Options 604B, 604B may enable a user to toggle between viewing the total (accumulated) number of defect items as a function of products or viewing the number of defect items per product. An option 606 may enable a user to toggle between viewing the number of defect items by product or by time (e.g., week). An option 608 may enable a user to toggle between viewing defect items not within an issue or all defect items. Options 610A, 610B may enable (e.g., by sliding the buttons 610A, 610B) to change the range of products to include within the defect item analysis region 602 and/or to see average number of defect items from different ranges of products. The user interface 600 may include information not shown/different from information shown in FIG. 6. For example, the user interface 600 may include information relating to defect item set within an issue, summary of defect item set within an issue, keywords relating to defect item set within an issue, and/or other information.

The organization and presentation of visuals as disclosed herein for defect items and issue items enables greater access to defect/issue items than allowed by existing interfaces. The organization and presentation of visuals as disclosed herein for defect items and issue items provides efficient interfaces for engineers to properly review, identify, and categorize defect items and issue items.

Figure 7:
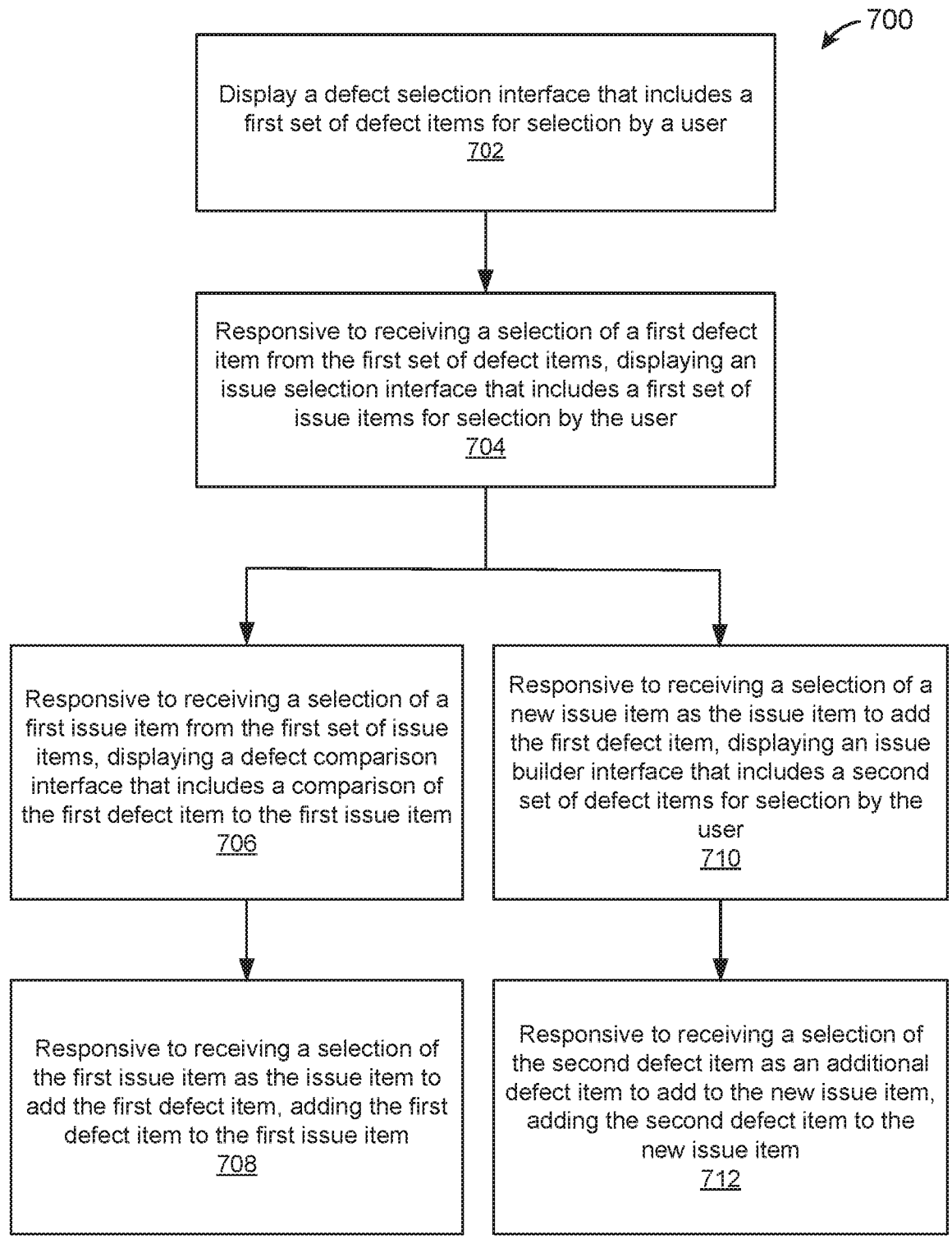
FIG. 7 illustrates a flowchart of an example method, in accordance with various embodiments.

FIG. 7 illustrates a flowchart of an example method 700, according to various embodiments of the present disclosure. The operations of method 700 presented below are intended to be illustrative. Depending on the implementation, the example method 700 may include additional, fewer, or alternative steps performed in various orders or in parallel. The example method 700 may be implemented in various computing systems or devices including one or more processors.

At block 702, a defect selection interface may be displayed. The defect selection interface may include a first set of defect items for selection by a user. The defect selection interface may include one or more first visuals indicating similarity of the first set of defect items to other defect items.

At block 704, responsive to receiving a selection of a first defect item from the first set of defect items, an issue selection interface may be displayed. The issue selection interface may include a first set of issue items for selection by the user. The first set of issue items may include a first issue item. The first issue item may include one or more defect items added to the first issue item.

At block 706, responsive to receiving a selection of the first issue item from the first set of issue items, a defect comparison interface may be displayed. The defect comparison interface may include a comparison of the first defect item to the first issue item. The defect comparison interface may include one or more second visuals indicating similarity of the first defect item to the first issue item. At block 708, responsive to receiving a selection of the first issue item as the issue item to add the first defect item, the first defect item may be added to the first issue item.

At block 710, responsive to receiving a selection of a new issue item as the issue item to add the first defect item, an issue builder interface may be displayed. The issue builder interface may include a second set of defect items for selection by the user. The second set of defect items may include a second defect item. The issue builder interface may include one or more third visuals indicating similarity of the first defect item to the second set of defect items. At block 712, responsive to receiving a selection of the second defect item as an additional defect item to add to the new issue item, the second defect item may be added to the new issue item Hardware Implementation The techniques described herein are implemented by one or more special-purpose computing devices. The special-purpose computing devices may be hard-wired to perform the techniques, or may include circuitry or digital electronic devices such as one or more application-specific integrated circuits (ASICs) or field programmable gate arrays (FPGAs) that are persistently programmed to perform the techniques, or may include one or more hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software, such as iOS, Android, Chrome OS, Windows XP, Windows Vista, Windows 7, Windows 8, Windows Server, Windows CE, Unix, Linux, SunOS, Solaris, iOS, Blackberry OS, VxWorks, or other compatible operating systems. In other embodiments, the computing device may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 8:
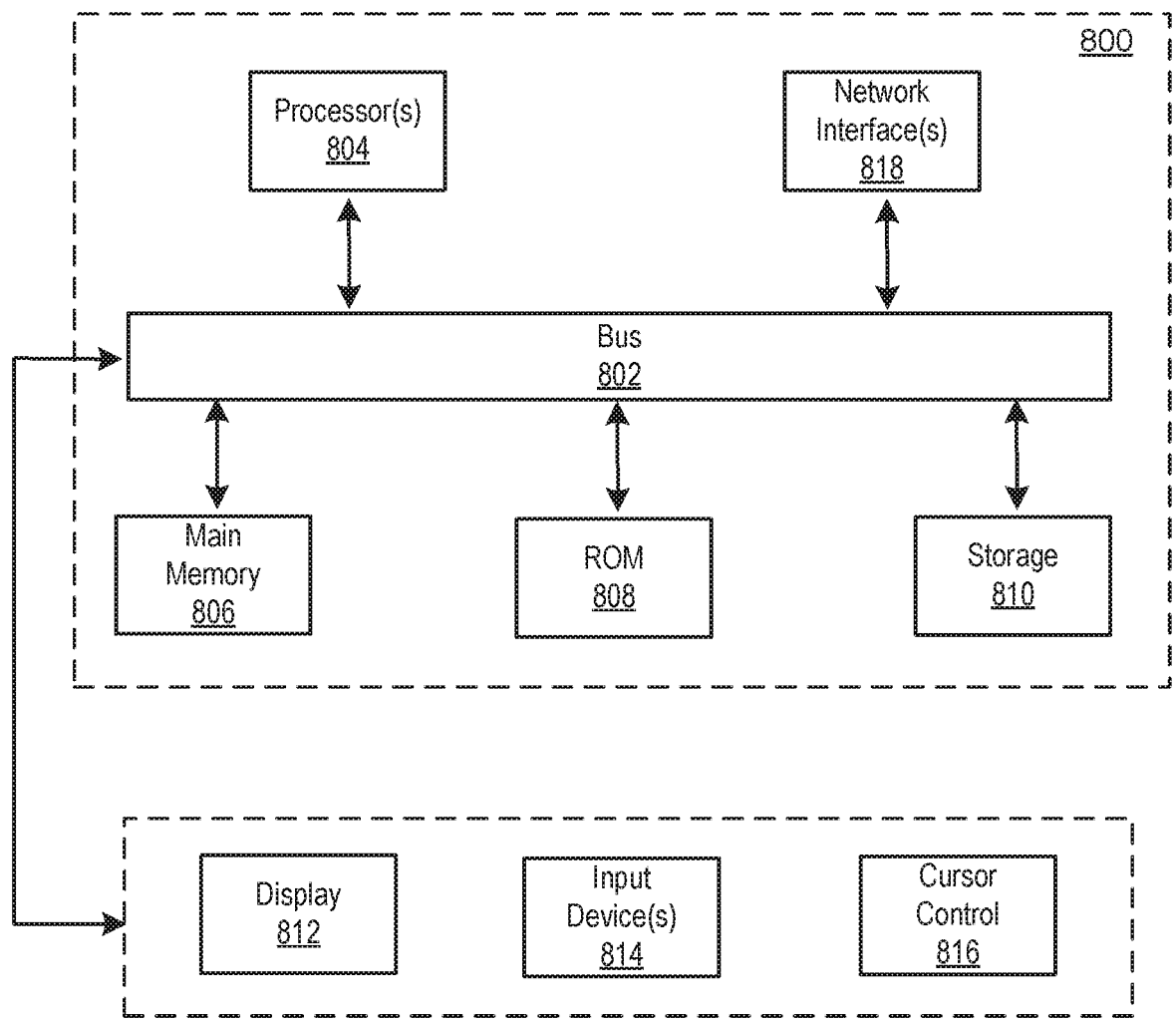
FIG. 8 illustrates a block diagram of an example computer system in which any of the embodiments described herein may be implemented.

FIG. 8 is a block diagram that illustrates a computer system 800 upon which any of the embodiments described herein may be implemented. The computer system 800 includes a bus 802 or other communication mechanism for communicating information, one or more hardware processors 804 coupled with bus 802 for processing information. Hardware processor(s) 804 may be, for example, one or more general purpose microprocessors.

The computer system 800 also includes a main memory 806, such as a random access memory (RAM), cache and/or other dynamic storage devices, coupled to bus 802 for storing information and instructions to be executed by processor 804. Main memory 806 also may be used for storing temporary variables or other intermediate information during execution of instructions to be executed by processor 804. Such instructions, when stored in storage media accessible to processor 804, render computer system 800 into a special-purpose machine that is customized to perform the operations specified in the instructions.

The computer system 800 further includes a read only memory (ROM) 808 or other static storage device coupled to bus 802 for storing static information and instructions for processor 804. A storage device 810, such as a magnetic disk, optical disk, or USB thumb drive (Flash drive), etc., is provided and coupled to bus 802 for storing information and instructions.

The computer system 800 may be coupled via bus 802 to a display 812, such as a cathode ray tube (CRT) or LCD display (or touch screen), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

The computing system 800 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage.

The computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor(s) 804 executing one or more sequences of one or more instructions contained in main memory 806. Such instructions may be read into main memory 806 from another storage medium, such as storage device 810. Execution of the sequences of instructions contained in main memory 806 causes processor(s) 804 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 810. Volatile media includes dynamic memory, such as main memory 806. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid state drive of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may retrieves and executes the instructions. The instructions received by main memory 806 may optionally be stored on storage device 810 either before or after execution by processor 804.

The computer system 800 also includes a communication interface 818 coupled to bus 802. Communication interface 818 provides a two-way data communication coupling to one or more network links that are connected to one or more local networks. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN (or WAN component to communicated with a WAN). Wireless links may also be implemented. In any such implementation, communication interface 818 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet". Local network and Internet both use electrical, electromagnetic or optical signals that carry digital data streams. The signals through the various networks and the signals on network link and through communication interface 818, which carry the digital data to and from computer system 800, are example forms of transmission media.

The computer system 800 can send messages and receive data, including program code, through the network(s), network link and communication interface 818. In the Internet example, a server might transmit a requested code for an application program through the Internet, the ISP, the local network and the communication interface 818.

The received code may be executed by processor 804 as it is received, and/or stored in storage device 810, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

Engines, Components, and Logic

Certain embodiments are described herein as including logic or a number of components, engines, or mechanisms. Engines may constitute either software engines (e.g., code embodied on a machine-readable medium) or hardware engines. A "hardware engine" is a tangible unit capable of performing certain operations and may be configured or arranged in a certain physical manner. In various example embodiments, one or more computer systems (e.g., a standalone computer system, a client computer system, or a server computer system) or one or more hardware engines of a computer system (e.g., a processor or a group of processors) may be configured by software (e.g., an application or application portion) as a hardware engine that operates to perform certain operations as described herein.

In some embodiments, a hardware engine may be implemented mechanically, electronically, or any suitable combination thereof. For example, a hardware engine may include dedicated circuitry or logic that is permanently configured to perform certain operations. For example, a hardware engine may be a special-purpose processor, such as a Field-Programmable Gate Array (FPGA) or an Application Specific Integrated Circuit (ASIC). A hardware engine may also include programmable logic or circuitry that is temporarily configured by software to perform certain operations. For example, a hardware engine may include software executed by a general-purpose processor or other programmable processor. Once configured by such software, hardware engines become specific machines (or specific components of a machine) uniquely tailored to perform the configured functions and are no longer general-purpose processors. It will be appreciated that the decision to implement a hardware engine mechanically, in dedicated and permanently configured circuitry, or in temporarily configured circuitry (e.g., configured by software) may be driven by cost and time considerations.

Accordingly, the phrase "hardware engine" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented engine" refers to a hardware engine. Considering embodiments in which hardware engines are temporarily configured (e.g., programmed), each of the hardware engines need not be configured or instantiated at any one instance in time. For example, where a hardware engine comprises a general-purpose processor configured by software to become a special-purpose processor, the general-purpose processor may be configured as respectively different special-purpose processors (e.g., comprising different hardware engines) at different times. Software accordingly configures a particular processor or processors, for example, to constitute a particular hardware engine at one instance of time and to constitute a different hardware engine at a different instance of time.

Hardware engines can provide information to, and receive information from, other hardware engines. Accordingly, the described hardware engines may be regarded as being communicatively coupled. Where multiple hardware engines exist contemporaneously, communications may be achieved through signal transmission (e.g., over appropriate circuits and buses) between or among two or more of the hardware engines. In embodiments in which multiple hardware engines are configured or instantiated at different times, communications between such hardware engines may be achieved, for example, through the storage and retrieval of information in memory structures to which the multiple hardware engines have access. For example, one hardware engine may perform an operation and store the output of that operation in a memory device to which it is communicatively coupled. A further hardware engine may then, at a later time, access the memory device to retrieve and process the stored output. Hardware engines may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein. As used herein, "processor-implemented engine" refers to a hardware engine implemented using one or more processors.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

It will be appreciated that an "engine," "system," "data store," and/or "database" may comprise software, hardware, firmware, and/or circuitry. In one example, one or more software programs comprising instructions capable of being executed by a processor may perform one or more of the functions of the engines, data stores, databases, or systems described herein. In another example, circuitry may perform the same or similar functions. Alternative embodiments may comprise more, less, or functionally equivalent engines, systems, data stores, or databases, and still be within the scope of present embodiments. For example, the functionality of the various systems, engines, data stores, and/or databases may be combined or divided differently.

"Open source" software is defined herein to be source code that allows distribution as source code as well as compiled form, with a well-publicized and indexed means of obtaining the source, optionally with a license that allows modifications and derived works.

The data stores described herein may be any suitable structure (e.g., an active database, a relational database, a self-referential database, a table, a matrix, an array, a flat file, a documented-oriented storage system, a non-relational No-SQL system, and the like), and may be cloud-based or otherwise.

As used herein, the term "or" may be construed in either an inclusive or exclusive sense. Moreover, plural instances may be provided for resources, operations, or structures described herein as a single instance. Additionally, boundaries between various resources, operations, engines, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Although the invention has been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The invention claimed is:

1. A system for providing user interfaces, the system comprising:
   one or more processors; and
   memory storing instructions that, when executed by the one or more processors, cause the system to perform:
      displaying a defect selection interface that includes a first set of defect items for selection by a user, the defect selection interface including one or more first visuals indicating similarity of the first set of defect items to other defect items, wherein the first set of defect items includes a first defect item;
      responsive to receiving a selection of the first defect item from the first set of defect items, displaying an issue selection interface that includes a first set of issue items for selection by the user, the first set of issue items including a first issue item, the first issue item including one or more defect items added to the first issue item;
      responsive to receiving a selection of the first issue item from the first set of issue items, displaying a defect comparison interface that includes a comparison of the first defect item to the first issue item, the defect comparison interface including one or more second visuals indicating similarity of the first defect item to the first issue item, the one or more second visuals being displayed at least one of: i) inline with at least a portion of one or more keywords of the first set of defect items or ii) based on a mouseover of the at least a portion of the one or more keywords of the first set of defect items; and
      responsive to receiving a selection of the first issue item as an issue item to add the first defect item, adding the first defect item to the first issue item.

2. The system of claim 1, wherein the memory storing instruction, when executed by the one or more processors, further cause the system to perform:
   responsive to receiving a selection of a new issue item as the issue item to add the first defect item, displaying an issue builder interface that includes a second set of defect items for selection by the user, the issue builder interface including one or more third visuals indicating similarity of the first defect item to the second set of defect items, wherein the second set of defect items includes a second defect item; and
   responsive to receiving a selection of the second defect item as an additional defect item to add to the new issue item, adding the second defect item to the new issue item.

3. The system of claim 1, wherein:
   the selection of the first issue item from the first set of issue items includes a selection of at least one of the one or more defect items added to the first issue item; and
   the comparison of the first defect item to the first issue item includes a comparison of the first defect item to the one or more defect items added to the first issue item and selected by the user.

4. The system of claim 1, wherein the one or more first visuals indicate similarity of the first set of defect items to the other defect items based on shape of the one or more first visuals.

5. The system of claim 1, wherein the one or more first visuals indicate similarity of the first set of defect items to the other defect items based on color of the one or more first visuals.

6. The system of claim 1, wherein the one or more second visuals indicate similarity of the first defect item to the first issue item based on color of the one or more second visuals.

7. The system of claim 1, wherein the one or more second visuals indicate similarity of the first defect item to the first issue item based on one or more percentage indicators.

8. The system of claim 1, wherein the memory storing instruction, when executed by the one or more processors, further cause the system to perform:
   responsive to receiving a selection of sharing the first issue item with one or more other users, displaying a sharing interface that includes a set of other users for selection by the user, wherein the set of other users are determined based on the one or more defect items added to the first issue item.

9. A method for providing user interfaces, the method being implemented by a computing system including one or more processors and storage media storing machine-readable instructions, the method comprising:
   displaying a defect selection interface that includes a first set of defect items for selection by a user, the defect selection interface including one or more first visuals indicating similarity of the first set of defect items to other defect items, wherein the first set of defect items includes a first defect item;

responsive to receiving a selection of the first defect item from the first set of defect items, displaying an issue selection interface that includes a first set of issue items for selection by the user, the first set of issue items including a first issue item, the first issue item including one or more defect items added to the first issue item;

responsive to receiving a selection of the first issue item from the first set of issue items, displaying a defect comparison interface that includes a comparison of the first defect item to the first issue item, the defect comparison interface including one or more second visuals indicating similarity of the first defect item to the first issue item, the one or more second visuals being displayed at least one of: i) inline with at least a portion of one or more keywords of the first set of defect items or ii) based on a mouseover of the at least a portion of the one or more keywords of the first set of defect items; and responsive to receiving a selection of the first issue item as an issue item to add the first defect item, adding the first defect item to the first issue item.

10. The method of claim 9, further comprising:

responsive to receiving a selection of a new issue item as the issue item to add the first defect item, displaying an issue builder interface that includes a second set of defect items for selection by the user, the issue builder interface including one or more third visuals indicating similarity of the first defect item to the second set of defect items, wherein the second set of defect items includes a second defect item; and responsive to receiving a selection of the second defect item as an additional defect item to add to the new issue item, adding the second defect item to the new issue item.

11. The method of claim 9, wherein:

the selection of the first issue item from the first set of issue items includes a selection of at least one of the one or more defect items added to the first issue item; and the comparison of the first defect item to the first issue item includes a comparison of the first defect item to the one or more defect items added to the first issue item and selected by the user.

12. The method of claim 9, wherein the one or more first visuals indicate similarity of the first set of defect items to the other defect items based on shape of the one or more first visuals.

13. The method of claim 9, wherein the one or more first visuals indicate similarity of the first set of defect items to the other defect items based on color of the one or more first visuals.

14. The method of claim 9, wherein the one or more second visuals indicate similarity of the first defect item to the first issue item based on color of the one or more second visuals.

15. The method of claim 9, wherein the one or more second visuals indicate similarity of the first defect item to the first issue item based on one or more percentage indicators.

16. The method of claim 15, wherein the one or more percentage indicators are displayed on the defect comparison interface in response to a mouseover.

17. The method of claim 9, further comprising responsive to receiving a selection of sharing the first issue item with one or more other users, displaying a sharing interface that includes a set of other users for selection by the user, wherein the set of other users are determined based on the one or more defect items added to the first issue item.

18. A non-transitory computer readable medium comprising instructions that, when executed, cause one or more processors to perform:

displaying a defect selection interface that includes a first set of defect items for selection by a user, the defect selection interface including one or more first visuals indicating similarity of the first set of defect items to other defect items, wherein the first set of defect items includes a first defect item;

responsive to receiving a selection of the first defect item from the first set of defect items, displaying an issue selection interface that includes a first set of issue items for selection by the user, the first set of issue items including a first issue item, the first issue item including one or more defect items added to the first issue item;

responsive to receiving a selection of the first issue item from the first set of issue items, displaying a defect comparison interface that includes a comparison of the first defect item to the first issue item, the defect comparison interface including one or more second visuals indicating similarity of the first defect item to the first issue item, the one or more second visuals being displayed at least one of: i) inline with at least a portion of one or more keywords of the first set of defect items or ii) based on a mouseover of the at least a portion of the one or more keywords of the first set of defect items; and responsive to receiving a selection of the first issue item as an issue item to add the first defect item, adding the first defect item to the first issue item.

\* \* \* \* \*